(12) United States Patent
Kochi et al.

(10) Patent No.: US 7,986,825 B2
(45) Date of Patent: Jul. 26, 2011

(54) MODEL FORMING APPARATUS, MODEL FORMING METHOD, PHOTOGRAPHING APPARATUS AND PHOTOGRAPHING METHOD

(75) Inventors: Nobuo Kochi, Tokyo (JP); Hiroyuki Aoki, Tokyo (JP); Hitoshi Otani, Tokyo (JP); Mitsuharu Yamada, Tokyo (JP); Tadayuki Ito, Tokyo (JP)

(73) Assignee: Topcon Corporation, Tokyo (JP)

( * ) Notice: Subject to any disclaimer, the term of this patent is extended or adjusted under 35 U.S.C. 154(b) by 1235 days.

(21) Appl. No.: 11/154,959

(22) Filed: Jun. 17, 2005

(65) Prior Publication Data

US 2006/0239539 A1 Oct. 26, 2006

(51) Int. Cl.
*G06K 9/00* (2006.01)
*G06K 7/00* (2006.01)
*G01C 3/14* (2006.01)
*G06T 17/00* (2006.01)
*G06G 5/00* (2006.01)

(52) U.S. Cl. .......... 382/154; 356/12; 345/420; 345/653; 382/312

(58) Field of Classification Search .................. 382/154, 382/312; 345/420, 653; 356/12
See application file for complete search history.

(56) References Cited

U.S. PATENT DOCUMENTS

| | | | | |
|---|---|---|---|---|
| 5,425,731 A | * | 6/1995 | Daniel et al. | 606/28 |
| 5,745,126 A | * | 4/1998 | Jain et al. | 382/154 |
| 5,999,642 A | * | 12/1999 | Gilliland | 382/154 |
| 6,052,100 A | * | 4/2000 | Soltan et al. | 345/6 |
| 6,079,862 A | * | 6/2000 | Kawashima et al. | 382/103 |
| 6,246,412 B1 | * | 6/2001 | Shum et al. | 345/419 |
| 6,519,359 B1 | * | 2/2003 | Nafis et al. | 382/154 |
| 6,990,228 B1 | * | 1/2006 | Wiles et al. | 382/154 |
| 7,034,821 B2 | * | 4/2006 | Baumberg | 345/419 |
| 7,194,125 B2 | * | 3/2007 | Vlasic et al. | 382/154 |
| 7,257,249 B2 | * | 8/2007 | Farsaie | 382/154 |
| 7,369,142 B2 | * | 5/2008 | Kondo et al. | 345/633 |
| 7,394,977 B2 | * | 7/2008 | Park et al. | 396/5 |
| 7,511,731 B2 | * | 3/2009 | Katayama et al. | 348/42 |
| 2001/0043738 A1 | * | 11/2001 | Sawhney et al. | 382/154 |
| 2002/0049375 A1 | * | 4/2002 | Strommer et al. | 600/407 |
| 2002/0051006 A1 | * | 5/2002 | Katagiri et al. | 345/653 |
| 2002/0191862 A1 | * | 12/2002 | Neumann et al. | 382/284 |
| 2003/0004645 A1 | * | 1/2003 | Kochi | 702/1 |
| 2003/0202089 A1 | * | 10/2003 | Alhadef et al. | 348/42 |

(Continued)

FOREIGN PATENT DOCUMENTS

JP 2002-074347 A 3/2002

(Continued)

*Primary Examiner* — Kathleen S Yuan
(74) *Attorney, Agent, or Firm* — Foley & Lardner LLP

(57) ABSTRACT

The present invention provides a model forming apparatus that can simply and efficiently form a three-dimensional model of an object using previously obtained three-dimensional model data of the object as a starting point. The apparatus comprises a photographing section 110 for photographing an object 10, an image data storage section 130 for storing three-dimensional model data of the object, a display section 140 for displaying a three-dimensional model based on the three-dimensional model data of the object 10, a recognition section 150 for recognizing an unmodeled part of the object 10 based on the three-dimensional model data stored in the image data storage section 130, and a photographing instruction information section 160 for obtaining photographing instruction information related to photographing the unmodeled part. The photographing section 110 photographs the object 10 in accordance with the photographing instruction information obtained by the photographing instruction information section 160.

10 Claims, 35 Drawing Sheets

U.S. PATENT DOCUMENTS

| | | | |
|---|---|---|---|
| 2004/0066454 A1* | 4/2004 | Otani et al. | 348/188 |
| 2004/0189700 A1* | 9/2004 | Mandavilli et al. | 345/751 |
| 2004/0222987 A1* | 11/2004 | Chang et al. | 345/419 |
| 2004/0247174 A1* | 12/2004 | Lyons et al. | 382/154 |
| 2004/0264761 A1* | 12/2004 | Mas et al. | 382/154 |
| 2005/0110789 A1* | 5/2005 | Le Ouay | 345/419 |
| 2006/0239537 A1* | 10/2006 | Shragai et al. | 382/154 |
| 2007/0147707 A1* | 6/2007 | Coste-Maniere et al. | 382/298 |

FOREIGN PATENT DOCUMENTS

| | | |
|---|---|---|
| JP | 2002-352224 A | 12/2002 |
| JP | 2003-042730 A | 2/2003 |
| JP | 2003-047026 | 2/2003 |
| JP | 2003-065737 A | 3/2003 |
| JP | 2004-037270 A | 2/2004 |

* cited by examiner (a) Polyline measurement on edges and front yard of building (Manual, automatic position detection)

(b) Wall surfaces are automatically measured, and meshes are generated for flat portrions.

(c) Results of modeling using image from sky (with texture)

(d) 3D – modeled aerial photograph

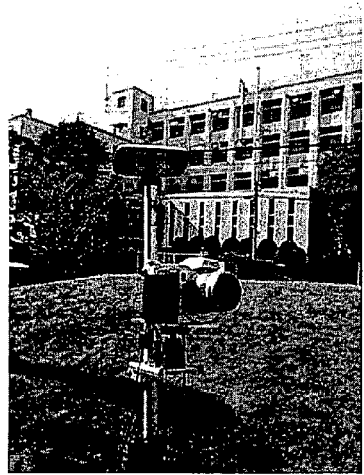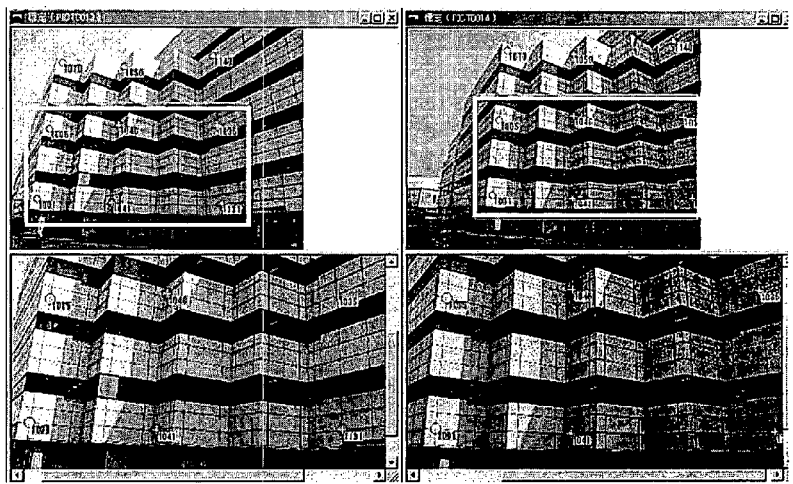
*FIG.18*

MODEL FORMING APPARATUS, MODEL FORMING METHOD, PHOTOGRAPHING APPARATUS AND PHOTOGRAPHING METHOD

FIELD OF THE INVENTION

The present invention relates to a model forming apparatus and a model forming method that can provide a photographer with photographing conditions, such as the photographing position, photographing direction, based on given conditions of an object, such as the image resolving power, positional accuracy, area of its unmodeled part, to form a three-dimensional model of the object. The present invention also relates to a photographing apparatus and a photographing method suitable to efficiently generate a 3D (three-dimensional) model of an object from images of the object photographed from the air or on the ground.

BACKGROUND OF THE INVENTION

Recent development in digital technology has made it possible to easily obtain detailed 3D data and high-resolution image data on a measuring object using a laser scanner or a digital photogrammetric technique. For example, a side surface of an object can be precisely measured from the ground, using close-range photogrammetry with a digital camera or using a ground-based measuring instrument.

However three-dimensional data obtained with a measuring instrument that measures the position of, or the distance and direction to, a measurement point (hereinafter simply referred to as "measuring instrument"), such as a laser scanner, an auto-tracking measuring instrument or a non-prism measuring instrument are basically composed of three-dimensional coordinate data including distance data. Therefore, it has become apparent that it is difficult to correlate the 3D data obtained with a measuring instrument with the site conditions, and hence to determine which part of a measuring object has been measured in tying the 3D data to image information of the measuring object, resulting in the complicated formation of a three-dimensional model of the object. Also, when 3D data are obtained with a measuring instrument installed on the ground, 3D data from the air, for example, 3D data on the top of a building or a road from the air, cannot be obtained to make it difficult to form a three-dimensional model of an object.

On the other hand, digital cameras and laser scanners for installation on flying bodies, such as helicopters or airplanes, have been developed in recent years. When images photographed from the air are combined with those photographed on the ground to generate a 3D model of an object, however, a significant amount of image distortion can occur due to the difference in photographing direction, photographing scale or lens aberration, causing a load of image corrections and hence making it difficult to form a three-dimensional model of the object.

The present invention has been made to solve the foregoing problems, and therefore has an objective to provide a model forming apparatus and a model forming method that can simply and efficiently form a three-dimensional model of an object using previously obtained three-dimensional model data of the object as a starting point.

Solving the foregoing problems, the present invention has another objective to provide a photographing apparatus and a photographing method that can efficiently generate a 3D model of an object by correcting images of the object photographed from the air or on the ground.

SUMMARY OF THE INVENTION

In order to achieve the above objectives, a model forming apparatus according to the present invention comprises, as shown in FIG. 1 for example, a photographing section 110 for photographing an object 10; an image data storage section 130 for storing three-dimensional model data of the object 10; a display section 140 for displaying a three-dimensional model based on the three-dimensional model data of the object 10; a recognition section 150 for recognizing an unmodeled part of the object 10 based on the three-dimensional model data stored in the image data storage section 130; and a photographing instruction information section 160 for obtaining photographing instruction information related to photographing the unmodeled part, wherein the photographing section 110 photographs the object 10 in accordance with the photographing instruction information obtained by the photographing instruction information section 160.

In the apparatus configured as above, the recognition section 150 recognizes a missing photographing direction for the object, the photographing instruction information section 160 obtains photographing instruction information necessary to photograph the object so as to make up for the missing photographing direction, and the display section 140 displays the information that allows the photographer to recognize the information. Thus, the apparatus suitably allows the photographer to photograph the object from the missing photographing direction to supplement the image data in an appropriate manner.

In order to achieve the above objectives, a model forming apparatus according to the present invention comprises, as shown in FIG. 19 for example, a photographing section 110 for photographing an object 10; an image data storage section 130 for storing at least three-dimensional model data of the object 10 or object image data obtained by photographing the object with the photographing section 110; a model forming section 155 for obtaining three-dimensional model data of the object 10 from the object image data stored in the image data storage section 130; a display section 140 for displaying a three-dimensional model based on the three-dimensional model data of the object 10; a recognition section 150 for recognizing an unmodeled part based on the three-dimensional model data stored in the image data storage section 130; and a photographing instruction information section 160 for obtaining photographing instruction information related to photographing the unmodeled part, wherein the display section 140 displays the three-dimensional model and the photographing instruction information together.

In the apparatus configured as above, the recognition section 150 recognizes a missing photographing direction for the object, the photographing instruction information section 160 obtains photographing instruction information necessary to photograph the object so as to make up for the missing photographing direction, and the display section 140 displays the information that allows the photographer to recognize the information. Thus, the apparatus suitably allows the photographer to photograph the object from the missing photographing direction to supplement the image data in an appropriate manner. The model forming section 155 obtains model data of the object 10 from the object image data stored in the image data storage section 130. The display section 140 displays a three-dimensional model based on the three-dimensional model data of the object 10, allowing the photographer to recognize an appropriate supplemental photographing direction for the object, in addition to the unmodeled part recognized by the recognition section 150. Thus, the photographer can supplement the image data by photographing the object from the missing, or an appropriate supplemental, photographing direction in an appropriate manner.

The model forming apparatus according to the present invention may further comprise, as shown in FIG. 19, a texture attaching section 192 for dividing the model formed from the three-dimensional model data by the model forming section 155 into plural areas and attaching texture of the object image data to each divided area based on the relationship between the each divided area and a photographing direction, wherein the display section 140 displays the model with texture formed by the texture attaching section 192.

Preferably, in the model forming apparatus according to the present invention, as shown in FIGS. 1 and 19, the display section 140 may be configured to graphically display the photographing instruction information obtained by the photographing instruction information section 160 as superimposed over a plan view of an area containing, or over a stereo model of, the object 10.

Preferably, the model forming apparatus according to the present invention may further comprise, as shown in FIGS. 1 and 19, a measurement setting section 170 for setting necessary measurement conditions (measurement accuracy, baseline lengths and overlap); and a photographing condition calculation section 180 for obtaining photographing conditions satisfying the measurement conditions set by the measurement setting section 170.

In order to achieve the above objectives, a model forming method causes, as shown in FIG. 2 for example, a computer to perform the steps of: displaying a three-dimensional model of an object 10 based on three-dimensional model data of the object 10 stored in an image data storage section 130 (S110); recognizing an unmodeled part of the object 10 based on the three-dimensional model data (S120); and obtaining photographing instruction information related to photographing the unmodeled part (S130). And the photographer photographs the object 10 with the photographing section 110 in accordance with the photographing instruction information (S140).

In order to achieve the above objectives, a model forming method causes, as shown in FIG. 20 for example, a computer to perform the steps of: obtaining model data of an object 10 from three-dimensional model data of the object 10 stored in an image data storage section 130 or from object image data obtained by photographing the object with a photographing section 110 (S210); displaying a three-dimensional model based on the three-dimensional model data of the object 10 (S220); recognizing an unmodeled part of the object 10 based on the three-dimensional model data of the object 10 (S230); obtaining photographing instruction information related to photographing the unmodeled part (S240); and displaying the three-dimensional model and the photographing instruction information together in a display section 140 (S250). The object 10 is photographed by the photographer with the photographing section 110 in accordance with the three-dimensional model and the photographing instruction information displayed in the display section 140 (S260).

In order to achieve the above objectives, a photographing apparatus comprises, as shown in FIG. 29 for example, a photographing section 110 for photographing an object 10; a photographing position measurement section 120 for obtaining photographing position information of the photographing section 110; an image data storage section 130 for storing plural image data of the object 10 with a known positional point; a model forming section 155 for forming a three-dimensional model of the object 10 using the image data stored in the image data storage section 130; and a model display section 144 for displaying, for the three-dimensional model of the object 10 formed by the model forming section 155, a three-dimensional model image of the object 10 as viewed from a photographing position of the photographing section 110 based on the image data stored in the image data storage section 130 and the photographing position information obtained by the photographing position measurement section 120.

In the apparatus thus configured, the model display section 144 displays a three-dimensional model image of the object 10 as viewed from a photographing position of the photographing section 110 when the photographing section 110 has moved. This allows the photographer to determine whether or not a particular photographing position of the photographing section 110 is an appropriate photographing position necessary to form a model of the object 10.

Preferably, in the photographing apparatus according to the present invention, the model forming section 155 may form a three-dimensional model of the object 10, using a first photographed image stored in the image data storage section 130 together with the photographing position information and a second photographed image displayed in the model display section 144, and the apparatus may further comprise: a photographing condition measurement section 220 for obtaining at least one of measurement accuracy, baseline, photographing position, photographing angle, and interval between photographing sections for three-dimensional measurement on the object 10 from the photographing position information related to the first and second photographed images.

In order to achieve the above objectives, a photographing apparatus comprises, as shown in FIG. 31 for example, a photographing section 110 for photographing an object 10; a photographing position designating section 280 for allowing designation of a photographing position of the photographing section 110; an image data storage section 130 for storing plural image data of the object 10 with a known positional point; a model forming section 155 for forming a three-dimensional model of the object 10 using the image data stored in the image data storage section 130; and a model display section 165 for displaying, for the three-dimensional model of the object 10 formed by the model forming section 155, a three-dimensional model image of the object 10 as viewed from the designated photographing position of the photographing section 110 based on the image data stored in the image data storage section 130 and the photographing position designated by the photographing position designating section 280.

In the apparatus configured as above, the model display section 165 displays a three-dimensional model image of the object 10 as viewed from the photographing section 110 when the photographing section 110 has moved to a photographing position designated by the photographing position designating section 280. This allows the photographer to determine whether or not the photographing position of the photographing section 110 designated by the photographing position designating section 280 is an appropriate photographing position necessary to form a model of the object 10.

Preferably, the photographing apparatus according to the present invention may further comprise: a photographing position measurement section 120 for obtaining photographing position information of the photographing section 10; and a photographing condition measurement section 220 for obtaining at least one of measurement accuracy, baseline, photographing position, photographing angle, and interval between photographing sections for three-dimensional measurement on the object 10 from the photographing position information related to the first and second photographed images. In this event, the first and second photographed images are such that the model forming section 155 forms a three-dimensional model of the object 10 using a first photographed image stored in the image data storage section 130 together with the photographing position information and a second photographed image displayed in the model display section 165.

Preferably, in the photographing apparatus according to the present invention, the image data storage section 130 stores at least a set of stereo images photographed with a photographing device other than the photographing section 110 that can be used to form a three-dimensional model of the object 10 in the model forming section 155. The set of stereo images may include, for example, a stereo image (small-scale aerial photograph) photographed with a photographing device other than the photographing section 110. Usually, the stereo images are photographed with a photographing device other than the photographing section 110 and preferably wide-area photographed images compared to the image photographed with the photographing section 110, and refer to small-scale, low-resolution and wide-area photographed images. As an alternative to an image photographed with other than the photographing section of the present photographing apparatus, solely an image photographed with the photographing section 110 of the present photographing apparatus may be used to perform, for example, the process of forming a 3D model.

In the photographing apparatus of the present invention, the image data stored in the image data storage section 130 may preferably include at least one of a stereo aerial photograph, a stereo small-scale photograph, a stereo low-resolution image and a wide-area photographed image, photographed with a photographing device other than the photographing section 110.

Preferably, in the photographing apparatus according to the present invention, the image data obtained by photographing with the photographing section 110 may be stored in the image data storage section 130 such that the known positional point of the object 10 can be displayed being superimposed over the object image; and the object image stored in the image data storage section 130 can therefore be used to form a three-dimensional model of the object 10 in the model forming section 155.

Preferably, in the photographing apparatus according to the present invention, the photographing section 110 may photograph a first photographed image to be stored in the image data storage section 130 together with the photographing position information and a second photographed image photographed with having an overlapping area with the first photographed image with respect to the object 10; and the image data storage section 130 may be configured to sequentially store the first photographed image and the second photographed image.

Preferably, in the photographing apparatus according to the present invention, as shown in FIGS. 29 and 31 for example, the photographing section 110 may photograph the object 10 within view sequentially from different photographing positions, and the photographing apparatus may further comprise a monitor image display section 142 for displaying an object image based on image data of the object 10 obtained by sequentially photographing the object 10.

Preferably, the photographing apparatus according to the present invention may, as shown in FIG. 29 for example, further comprise a reference point display position computing section 190 for displaying, in the monitor image display section 142, at least one of a reference point or a pass point superimposed over the image data obtained by sequentially photographing the object 10.

Preferably, the photographing apparatus according to the present invention may, as shown in FIGS. 29 and 31 for example, further comprises a measurement condition display section 146 for displaying photographing conditions obtained by measurement with the photographing condition measurement section 220.

In order to achieve the above objectives, a photographing apparatus 300 according to the present invention comprises, as shown in FIG. 33 for example, a photographing section 110 for photographing an object 10; a finder image display section 290 for displaying the object image being photographed by the photographing section 110; an image data storage section 130 for storing plural image data of the object 10 with a known positional point; and a data forming section 240 for forming reference point data or a three-dimensional model of the object 10 using the image data stored in the image data storage section 130, wherein the finder image display section 290 is configured to display the reference point data or the three-dimensional model over the object image.

In the apparatus configured as above, reference point data or a three-dimensional model of the object 10 formed by the data forming section 240 using the image data stored in the image data storage section 130 are displayed over an image of the object 10 photographed with the photographing section 110 and displayed in the finder image display section 290. This allows the photographer to determine whether or not a particular photographing position of the photographing section 110 has already been used to obtain reference point data or to form a three-dimensional model of the object 10, and makes the photographing work necessary to form a three-dimensional model of the object 10 proceed smoothly.

In order to achieve the above objectives, a photographing method according to the present invention causes, as shown in FIG. 30 for example, a computer to perform the steps of: obtaining photographing position information for photographing an object 10 with a photographing section 110 (S710); forming a three-dimensional model of the object 10 using image data stored in an image data storage section 130 for storing plural image data of the object 10 with a known positional point (S720); and displaying, for the three-dimensional model of the object 10, a three-dimensional model image of the object 10 as viewed from a photographing position of the photographing section 110 based on the image data stored in the image data storage section 130 and the photographing position information (S730).

In order to achieve the above objectives, a photographing method according to the present invention causes, as shown in FIG. 32 for example, a computer to perform the steps of: entering information on a photographing position designated for photographing an object 10 with a photographing section 110 (S810); forming a three-dimensional model of the object 10 using image data stored in an image data storage section 130 for storing plural image data of the object 10 with a known positional point (S820); and displaying, for the three-dimensional model of the object 10, a three-dimensional model image of the object 10 as viewed from the designated photographing position of the photographing section 110 based on the image data stored in the image data storage section 130 and the designated photographing position (S830).

According to the model forming apparatus of the present invention, the recognition section recognizes a missing photographing direction for the object, and the photographing instruction information section allows the photographer to recognize photographing instruction information necessary to photograph the object so as to make up for the missing photographing direction, allowing the photographer to photograph the object from the missing photographing direction to supplement the image data in an appropriate manner. Then, for example by bundle adjustment of an aerial photograph and an image photographed on the ground, a 3D model of the object can be easily constructed.

According to the photographing apparatus of the present invention, the model display section displays a three-dimensional model image of the object as viewed from a photographing position of the photographing section when the photographing section has moved. This allows the photographer to determine whether or not a particular photographing position of the photographing section is an appropriate photographing position necessary to form a model of the object, and makes the photographing work necessary to form a three-dimensional model of the object proceed smoothly.

Also, according to the photographing apparatus of the present invention, the model display section displays a three-dimensional model image of the object as viewed from a photographing position of the photographing section when the photographing section has moved to the photographing position designated by the photographing position designating section. This allows the photographer to determine whether or not the photographing position of the photographing section designated by the photographing position designating section is an appropriate photographing position necessary to form a model of the object, and makes the photographing work necessary to form a three-dimensional model of the object proceed smoothly.

Also, according to the photographing apparatus of the present invention, reference point data or a three-dimensional model of the object formed by the data forming section using the image data stored in the image data storage section are displayed over an image of the object photographed with the photographing section and displayed in the finder image display section. This allows the photographer to determine whether or not a particular photographing position of the photographing section has already been used to obtain reference point data or to form a three-dimensional model of the object, and makes the photographing work necessary to form a three-dimensional model of the object proceed smoothly.

The basic Japanese Patent Applications No. 2004-203987 filed on Jul. 9, 2004 and No. 2004-181809 filed on Jun. 18, 2004 are hereby incorporated in their entirety by reference into the present application.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not literally fall within the scope of the present claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

BRIEF DESCRIPTION OF THE DRAWINGS

FIG. 18 shows the scene of photographing the object with the photographing section 110 from an appropriate supplemental direction, and additionally photographed images.

DETAILED DESCRIPTION OF THE PREFERRED EMBODIMENT

Figure 1:
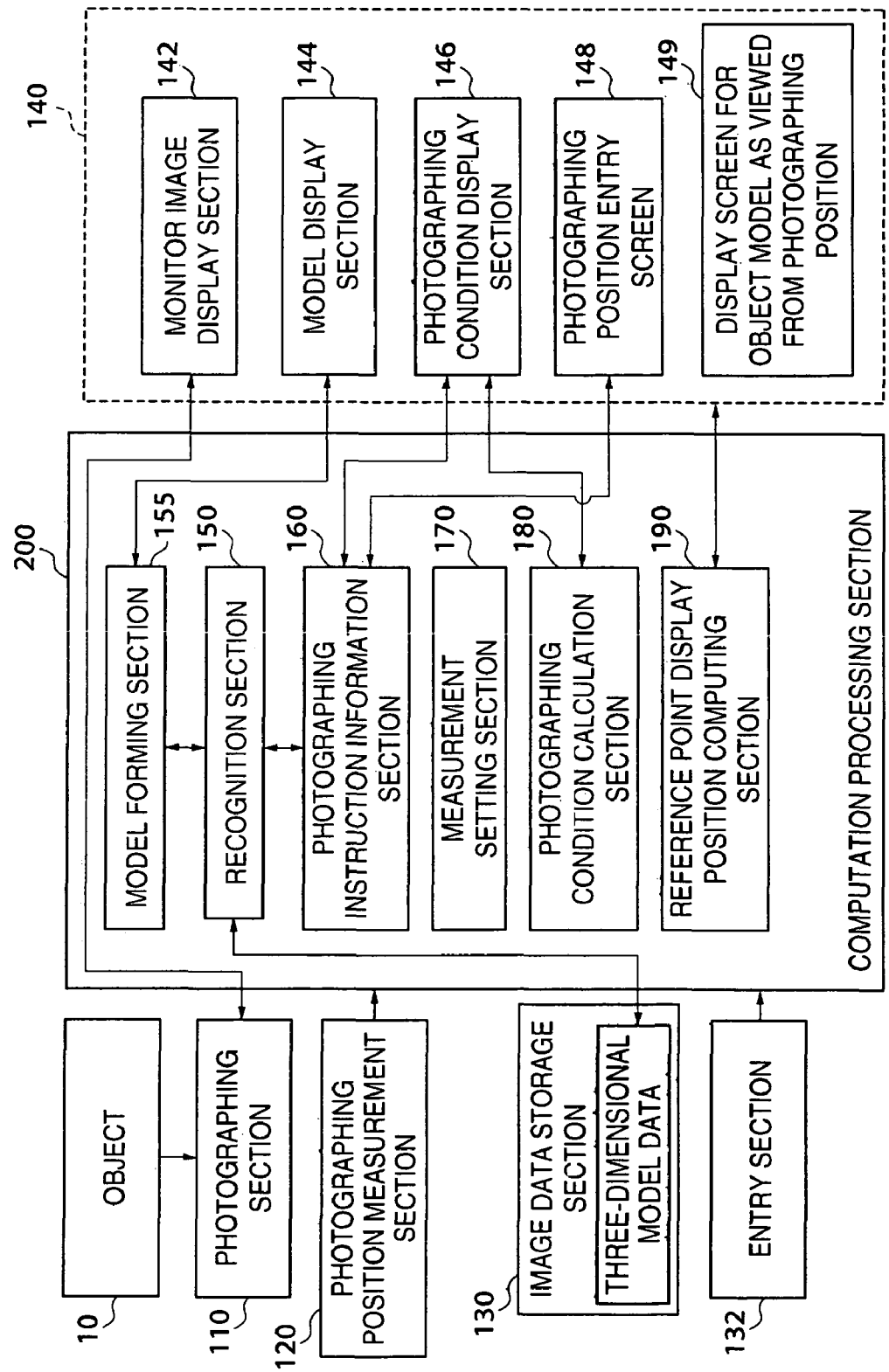
FIG. 1 is a general block diagram illustrating the functionality of a first embodiment of the present invention.

The present invention will be described below with reference to the figures. Identical or corresponding components in the figures are given with the same or similar reference numerals and symbols, and their descriptions will not be repeated.

First Embodiment

Figure 3:
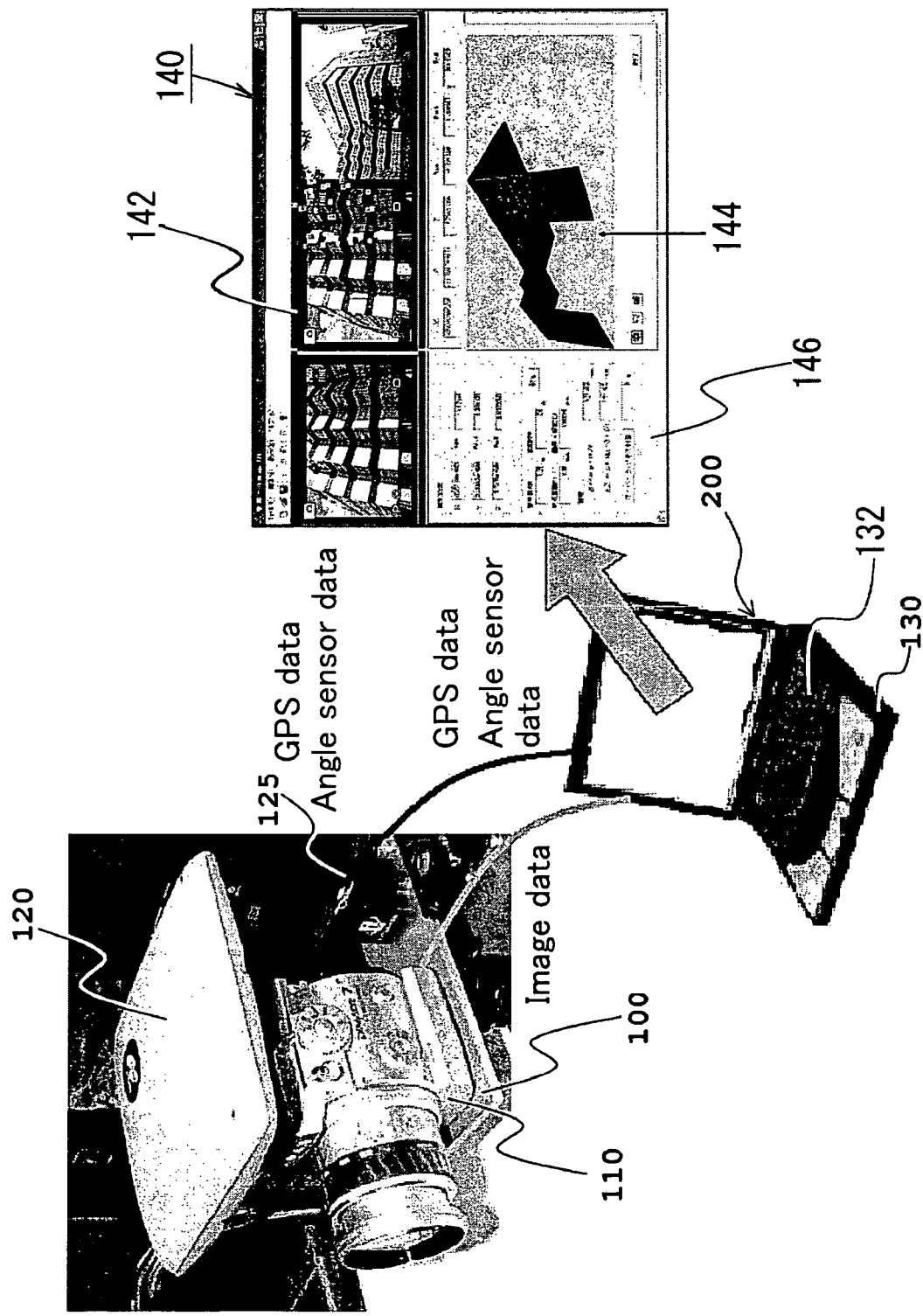
FIG. 3 shows the system configuration of the first embodiment of the present invention.

FIG. 1 is a general block diagram illustrating the functionality of a first embodiment of the present invention. FIG. 3 shows the system configuration of the first embodiment of the present invention. An object 10 is a tangible substance such as a measuring object or manufacturing object, and may be, for example, a structure of various kinds such as an architecture included in the field of city planning, construction, maintenance or a cultural property, a person, or a landscape. In the figure, a model forming apparatus of the present invention includes a photographing unit housing 100, a photographing section 110, photographing position measurement sections 120, 125 for obtaining information on the photographing position of the photographing section 110, an image data storage section 130 for storing plural image data of the object 10 with known positional points, a display section 140 such as a liquid crystal display or CRT, and a computation processing section 200. The model forming apparatus may be called, for example, a virtual guiding system (a photographing guiding system).

The photographing unit housing 100 integrally holds the photographing section 110 and the photographing position measurement sections 120, 125. The photographing unit housing 100 is made small and lightweight for easy operation by a photographer. As the photographing section 110, for example, a digital camera for civilian use, preferably one capable of video output may be used. The number of pixels may be selected depending on the resolution required. As the photographing position measurement section 120, a GPS is used so that it can measure the photographing position (X, Y, Z) of the photographing section 110 as terrestrial latitude, longitude and altitude. Preferably, the photographing position measurement section 120 can switch between the kinematic and real-time kinematic modes. The photographic position measurement section 125 uses a 3-axis angle sensor for measuring the photographing attitude (Yaw, Pitch, Law) of the photographing section 110. The photographing position measurement section 125 has a resolving power of 0.05°, for example, with a static accuracy of 1° RMS and a dynamic accuracy of 3° RMS.

The image data storage section 130 is adapted to use a medium for storing image information, such as a flexible disk, a MD or a DVD. A key entry section 132 is used by an operator to make key entry into the computation processing section 200, and includes, for example, a keyboard, a mouse or a touch panel. The display section 140 has a mode I with a 3-divided display area of a monitor image display section 142, a model display section 144 and a measurement condition display section (photographing condition display section) 146, and a mode II with a 3-divided display area of the measurement condition display section 146, a photographing position entry screen 148 and a display screen for object model 149 as viewed from photographing position. The mode I is suitable to allow recognizing an unmodeled part of the object 10. The mode II is suitable to display photographing instruction information related to photographing the unmodeled part of the object 10 so as to allow taking a ground-based photograph as a supplement to a basic aerial photograph.

The computation processing section 200 may be implemented by, for example, a general-purpose laptop computer, and receives the image information obtained by photographing with the photographing section 110, and the position information (X, Y, Z) and the attitude information (Yaw, Pitch, Law) on the photographing section 110 obtained by measurement with the photographing position measurement sections 120, 125. The general-purpose laptop computer includes an electromagnetic storage device such as a flexible disk storage device or CD-ROM, which is used as the image data storage section 130. The general-purpose laptop computer stores as software a recognition section 150, a model forming section 155, a photographing instruction information section 160, a measurement setting section 170, a photographing condition calculation section 180 and a reference point display position computing section 190.

The recognition section 150 recognizes an unmodeled part of the object 10 based on three-dimensional model data stored in the image data storage section 130. The model forming section 155 uses the image data stored in the image data storage section 130 to form a three-dimensional model of the object 10. The calculation procedures to generate a three-dimensional model are specifically described in JP-A-2002-352224, JP-A-2003-42730 and JP-A-2003-65737 proposed by the present applicant and so on. The model forming section 155 may be a 3D measurement system PI-3000V2 (trade name) available from TOPCON Corporation. The model forming section 155 can measure in 3D and model all in one, from aerial photographs to digital camera images. The recognition section 150 extracts an area of the object 10 where the model forming section 155 cannot form a three-dimensional model, and specifically recognizes the orientation of a surface of the object 10 where no or insufficient image information is available.

The photographing instruction information section 160 obtains photographing instruction information related to photographing the unmodeled part of the object 10 recognized by the recognition section 150. The photographing instruction information obtained with the photographing instruction information section 160 is displayed, for example, on the measurement condition display section 146, the photographing position entry screen 148 and the display screen for object model 149 as viewed from photographing position. The photographing instruction information includes geodesic position information for measuring the object 10, the distance between the object 10 and the photographing section 110, the focal length of the photographing section 110, and the like. Preferably, the measurement condition display section 146 graphically displays the photographing instruction information calculated by the photographing instruction information section 160 as superimposed over a plan view of an area containing, or over a stereo model of, the object 10.

The measurement setting section 170 sets measurement conditions necessary to form a three-dimensional model of the object 10. The measurement conditions can be derived from the theory of stereo image measurement, and include, for example, the measurement accuracy, and the baseline lengths of, and the overlap (redundancy ratio) between the left and right stereo photographs. The photographing condition calculation section 180 obtains photographing conditions that satisfy the measurement conditions set by the measurement setting section 170. For example, the photographing condition calculation section 180 obtains, based on the most recent image photographed by the photographing section 110, photographing conditions for the photographing section 110 for the next photographing. The photographing conditions may preferably be consistent with the photographing instruction information obtained by the photographing instruction information section 160.

The reference point display position computing section 190 displays in real time a reference point as superimposed over the object 10 on a finder image being displayed in the monitor image display section 142. This superimposed state is calculated by the reference point display position computing section 190, which checks image information from the finder of the photographing section 110 to calculate whether or not the coordinate of the reference point entered beforehand falls within the displayable area in the finder image.

Figure 4:
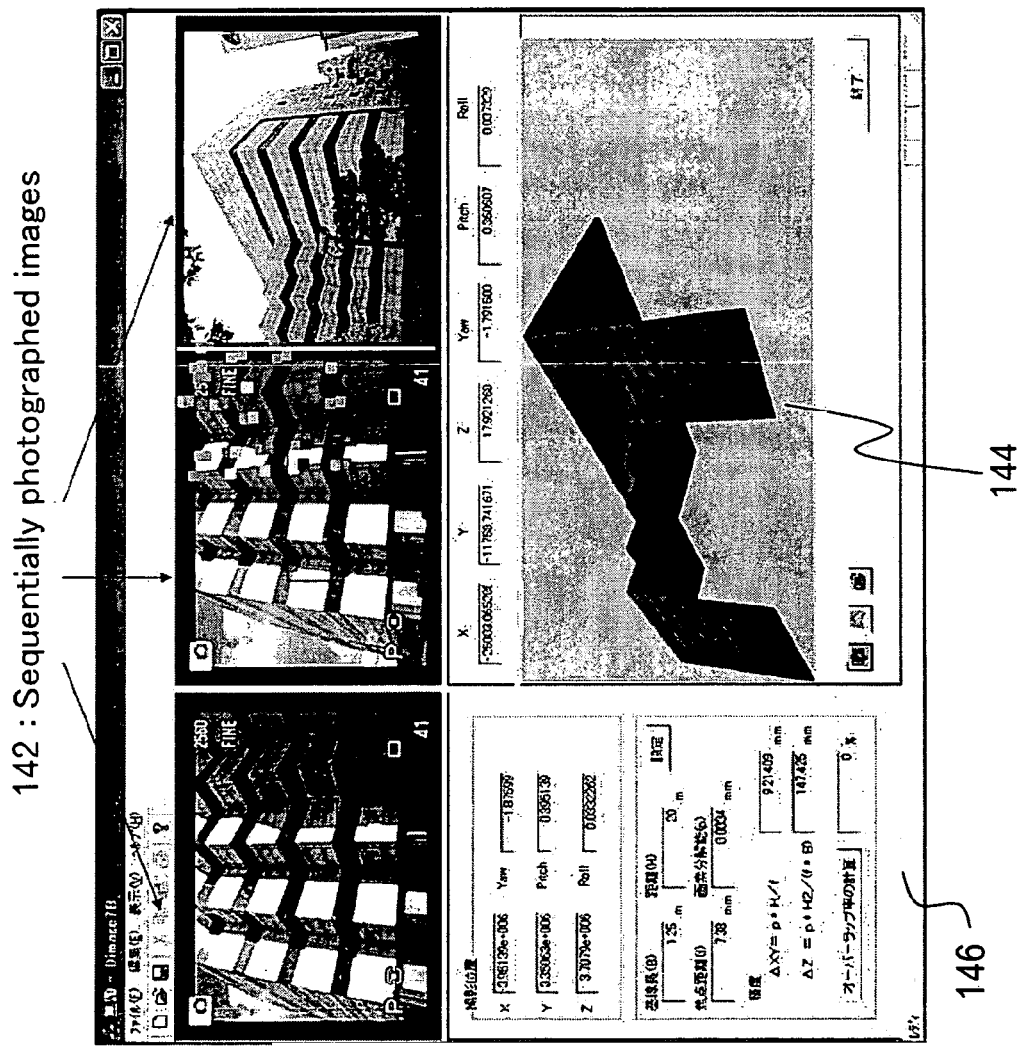
FIG. 4 is an exemplary screen view displayed on a liquid crystal display panel.

FIG. 4 is an exemplary screen view displayed on a liquid crystal display panel, which is used as the monitor image display section 142, the model display section 144 and the measurement condition display section 146. The monitor image display section 142 displays, on the liquid crystal display panel, the finder image of the photographing section 110, which has been sent to the computer constituting the computation processing section 200 via an interface of various types. Preferably, the reference point relating to the object 10 contained in the finder image may also be displayed as being superimposed, by the reference point display position computing section 190. This allows determining how many reference points are being contained in the monitor image display section 142 when the photographing section 110 performs photographing. The monitor image display section 142 may be configured to call up and to display first and second photographed images sequentially, which have been photographed by the photographing section 110 and stored in the image data storage section 130.

The apparatus as shown in FIG. 4 is designed to display three screens, of which two from the left show images previously photographed and stored in the image data storage section 130, and the rightmost one shows an image currently being captured by the photographing section 110. The photographer can easily find the photographing point while checking in real time the three screens being displayed in the monitor image display section 142. Also, previously photographed images can be checked by having images stored in the image data storage section 130 sequentially displayed in all of the three screens.

The model display section 144 can display results modeled for the object 10 by the model forming section 155 as viewed with the photographing position and posture of the photographing section 110. This allows determination of the photographing position for the object 10 while recognizing the missing part in the model of the object 10 and checking an appropriate supplemental photographing direction for the object 10. The object 10 can be displayed three-dimensionally using, for example, an OpenGL function. The object 10 is measured three-dimensionally, and its reconstructed image can be displayed through wireframes or texture-mapping. This allows an image of the object 10 to be displayed in the model display section 144 while changing the viewpoint and resolution in real time. The unmodeled part of the object 10 recognized by the recognition section 150 is not displayed in the object 10 image displayed on the model display section 144 as it is a missing surface, which allows the photographer to recognize that supplemental photographing is necessary.

The measurement condition display section 146 displays the position information (X, Y, Z) of the photographing section 110 obtained by measurement with the photographing position measurement section 120, and the attitude information (Yaw, Pitch, Law) of the photographing section 110 obtained by measurement with the photographing position measurement section 125. The measurement condition display section 146 also displays the measurement conditions set by the measurement setting section 170, such as the baseline length (B), distance (H), focal length (f), pixel resolving power (p), accuracy ($\Delta XY$, $\Delta Z$), overlap (redundancy ratio) and so on.

The image data storage section 130 stores images photographed by the photographing section 110 and the photographing positions at which the images have been photographed. The photographing condition calculation section 180 calculates the overlap ratio of the finder image (second photographed image) displayed in the monitor image display section 142 with respect to the last photographed image (first photographed image) stored in the image data storage section 130. Using the measurement accuracy, baseline, photographing position, photographing angle and interval between the photographing sections for three-dimensional measurement of the object 10 set in the measurement setting section 170, the photographing condition calculation section 180 calculates an approximate accuracy of the object 10, and outputs it to the measurement condition display section 146 for display.

The photographing condition calculation section 180 obtains an approximate accuracy by the following equations:

$$\Delta XY = H * \delta p / f \tag{1}$$

$$\Delta Z = H * H * \delta p / (f * B) \tag{2}$$

Here, $\delta p$ represents the pixel resolving power of the photographing section 110 or the reading resolving power of the scanner, f represents the focal length, which are known according to the type of the photographing section 110 used. The baseline length B is calculated from the position measured by the photographing position measurement section 120 where an image has been photographed, and the position measured by the photographing position measurement section 120 where the next photographing is performed. The photographing distance H can be calculated, if any reference point or a 3D model is present in the area to be photographed, based on the position of the photographing position measurement section 120 and that of the reference point or 3D model. If any reference point or a 3D model is not present in the photograph, an approximate value should be entered. From the parameters used in the equations above, namely the resolving power $\delta p$, focal length f, baseline length B and photographing distance H, approximate accuracies $\Delta XY$, $\Delta Z$ after measurement of a stereo model just about to be photographed can be calculated.

Figure 5:
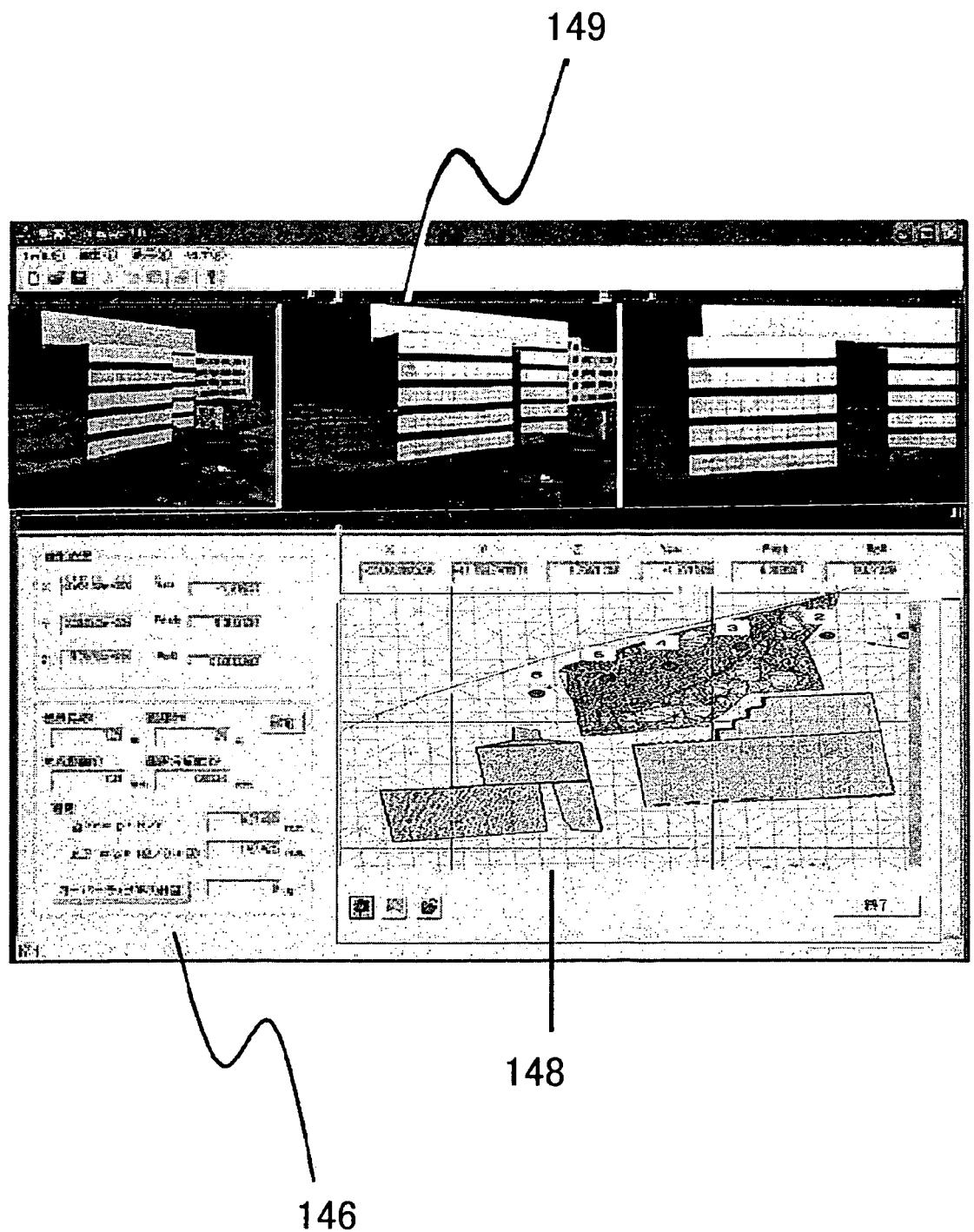
FIG. 5 is another exemplary screen view displayed on the liquid crystal display panel.

FIG. 5 is another exemplary screen view displayed on the liquid crystal display panel, which is used as the measurement condition display section 146, the photographing position entry screen 148 and the display screen for object model 149 as viewed from photographing position. The photographing instruction information section 160 obtains photographing instruction information related to photographing an unmodeled part of the object 10 recognized by the recognition section 150. Thus, by designating an appropriate photographing position on the photographing position entry screen 148 using the entry section 132, the display screen for object model 149 displays a model image of the object as viewed from the photographing position.

Figure 6:
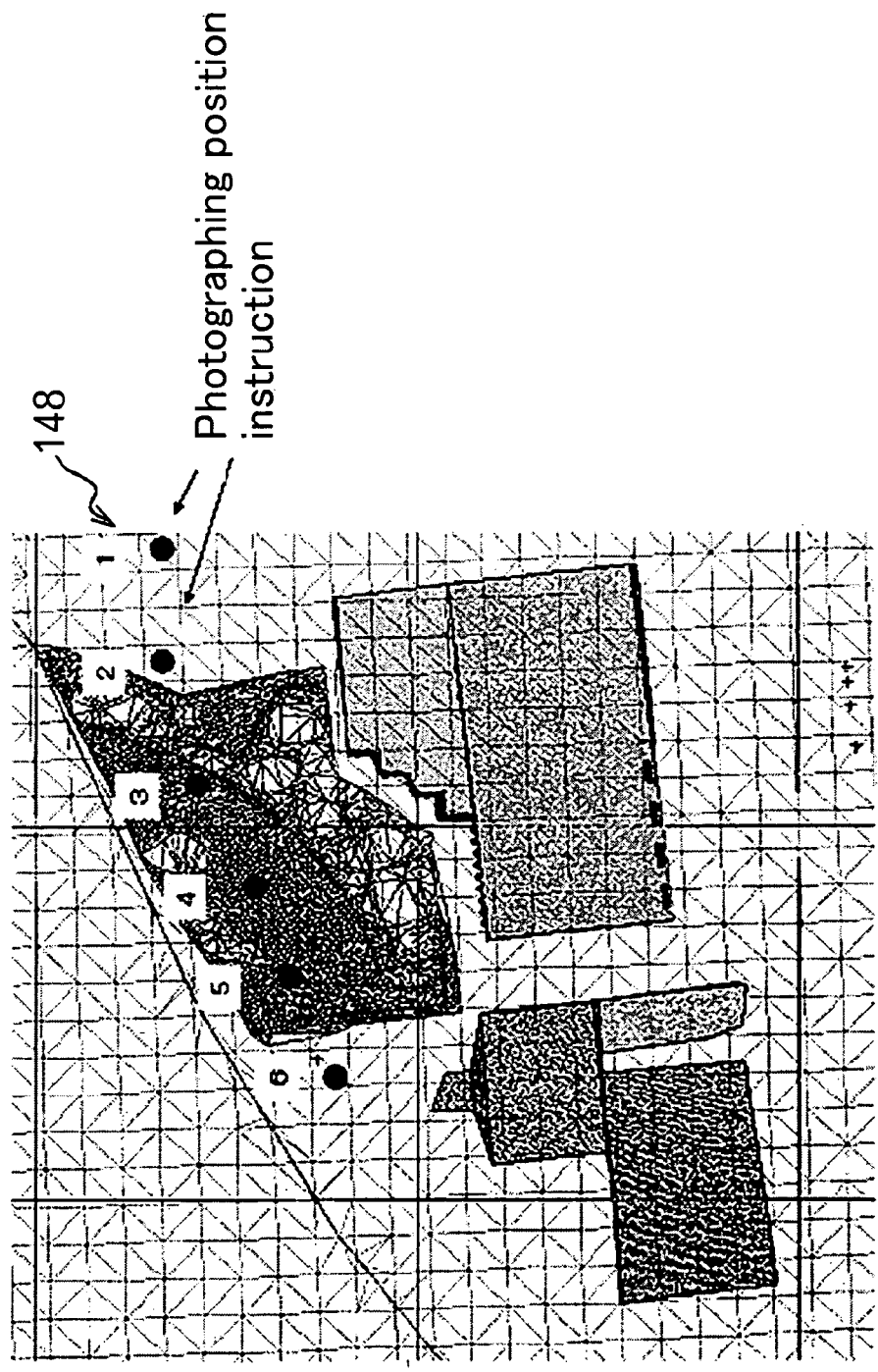
FIG. 6 illustrates an exemplary photographing position entry screen used to enter the photographing position.
Figure 7:
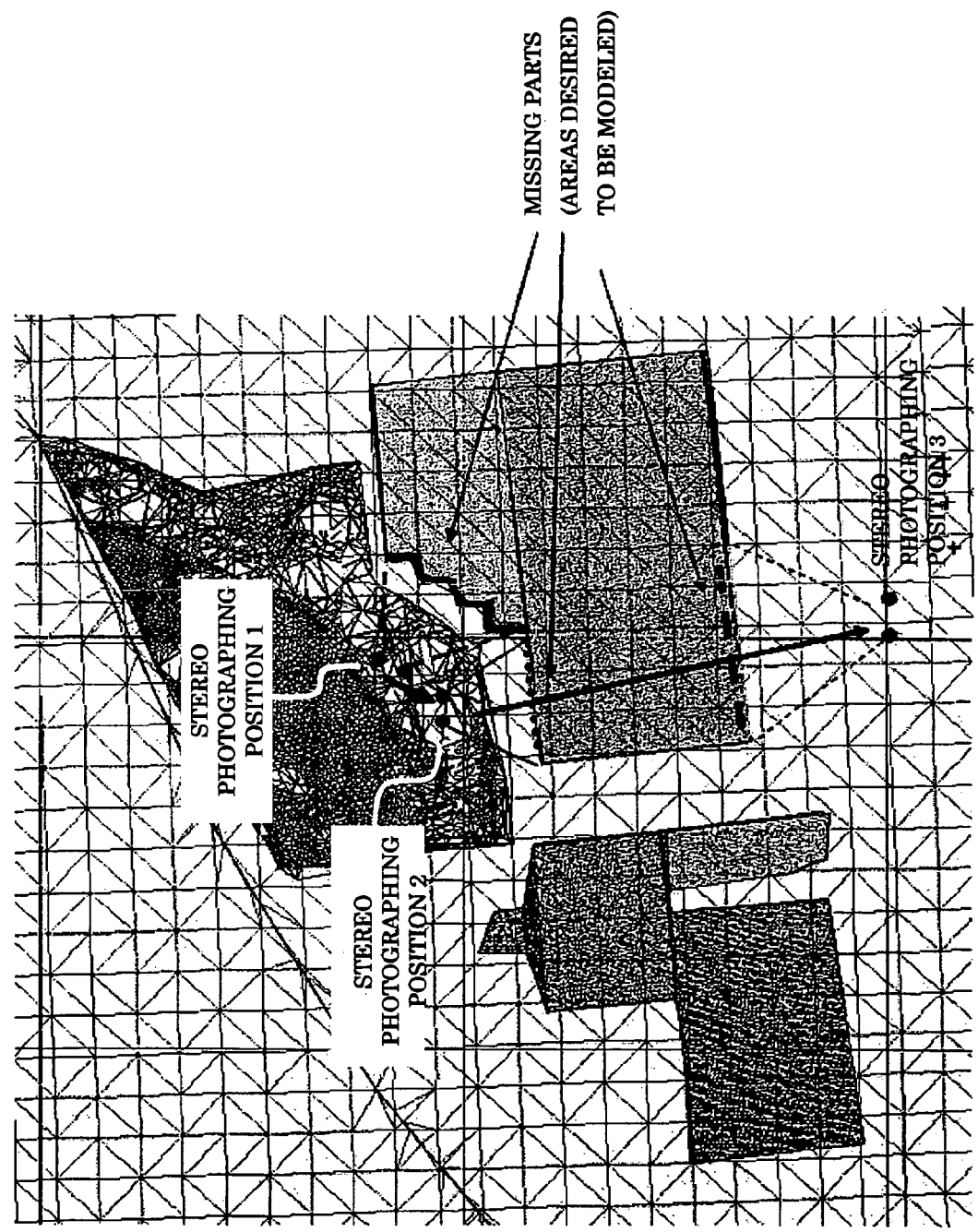
FIG. 7 is a plan view showing obtained photographing positions.
Figure 8:
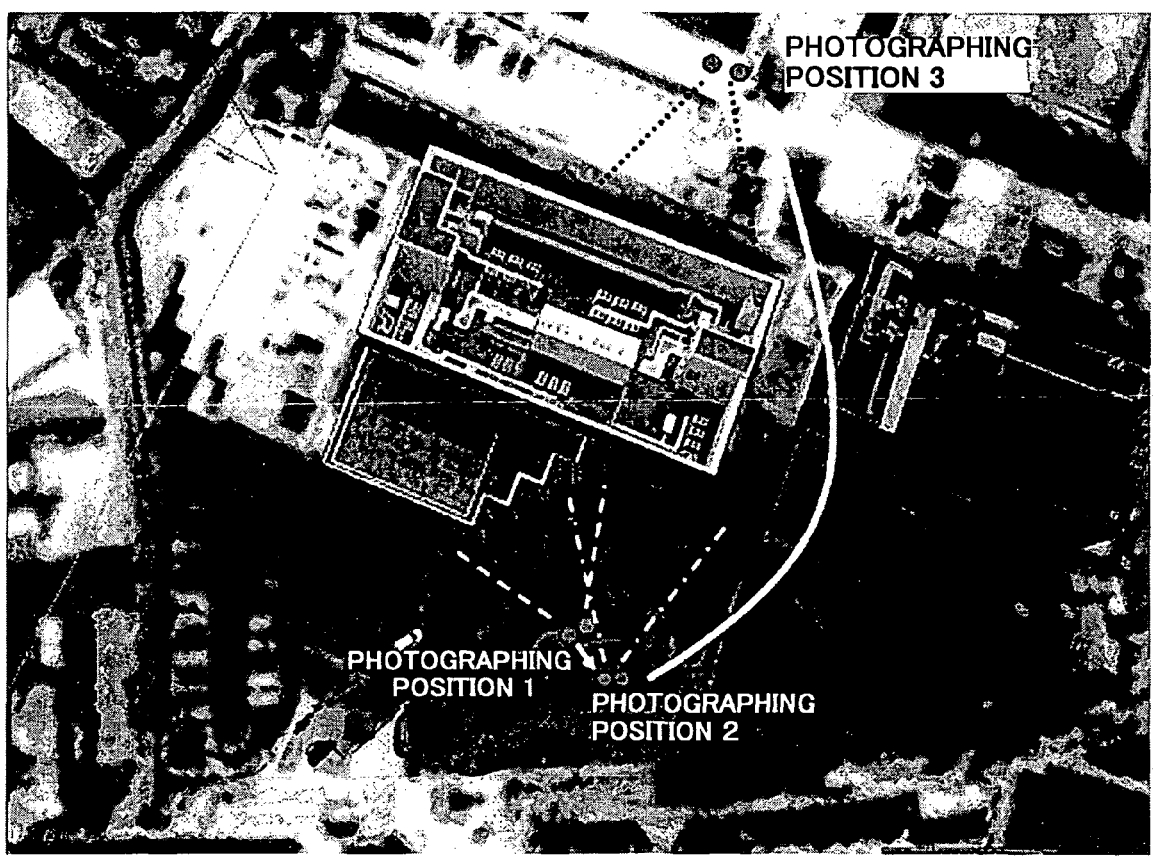
FIG. 8 is an exemplary 3D model view showing the obtained photographing positions.
Figure 9:
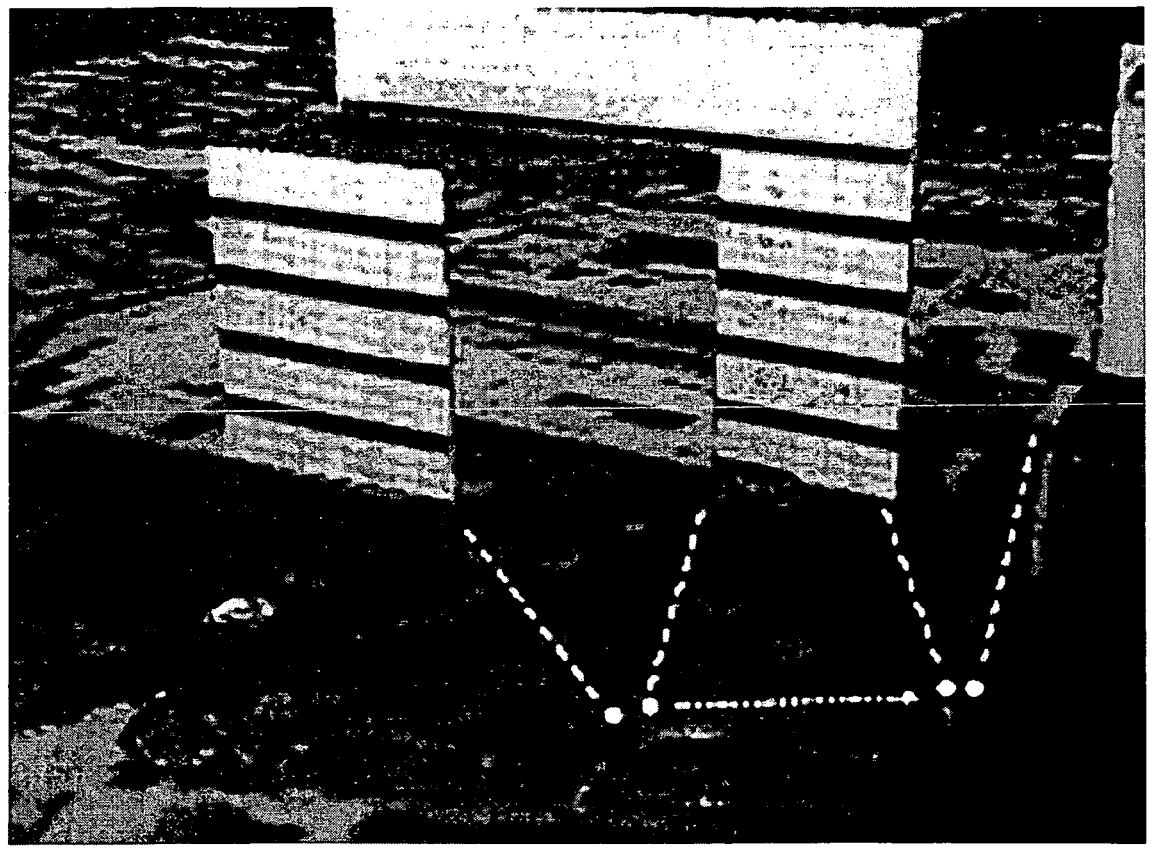
FIG. 9 is an exemplary 3D model view showing the obtained photographing positions.

FIG. 6 illustrates an exemplary photographing position entry screen used to enter the photographing position. Preferably, the photographing position entry screen 148 may use, for example, a plan view of the object displayed on the liquid crystal display panel. On the photographing position entry screen 148, the entry section 132 such as a light pen or a mouse is used to enter photographing positions 1-6. Then, the model forming section 155 forms 3D models of the object as viewed from the positions entered as photographing positions, and displays visual images on the display screen for object model 149 as viewed from photographing position. The display section 140 may display these photographing positions as stereo photographing positions, together with an area desired to be modeled on a plan view as shown in FIG. 7, or on a model image as shown in FIGS. 8 and 9, so as to guide the photographer.

Figure 10:
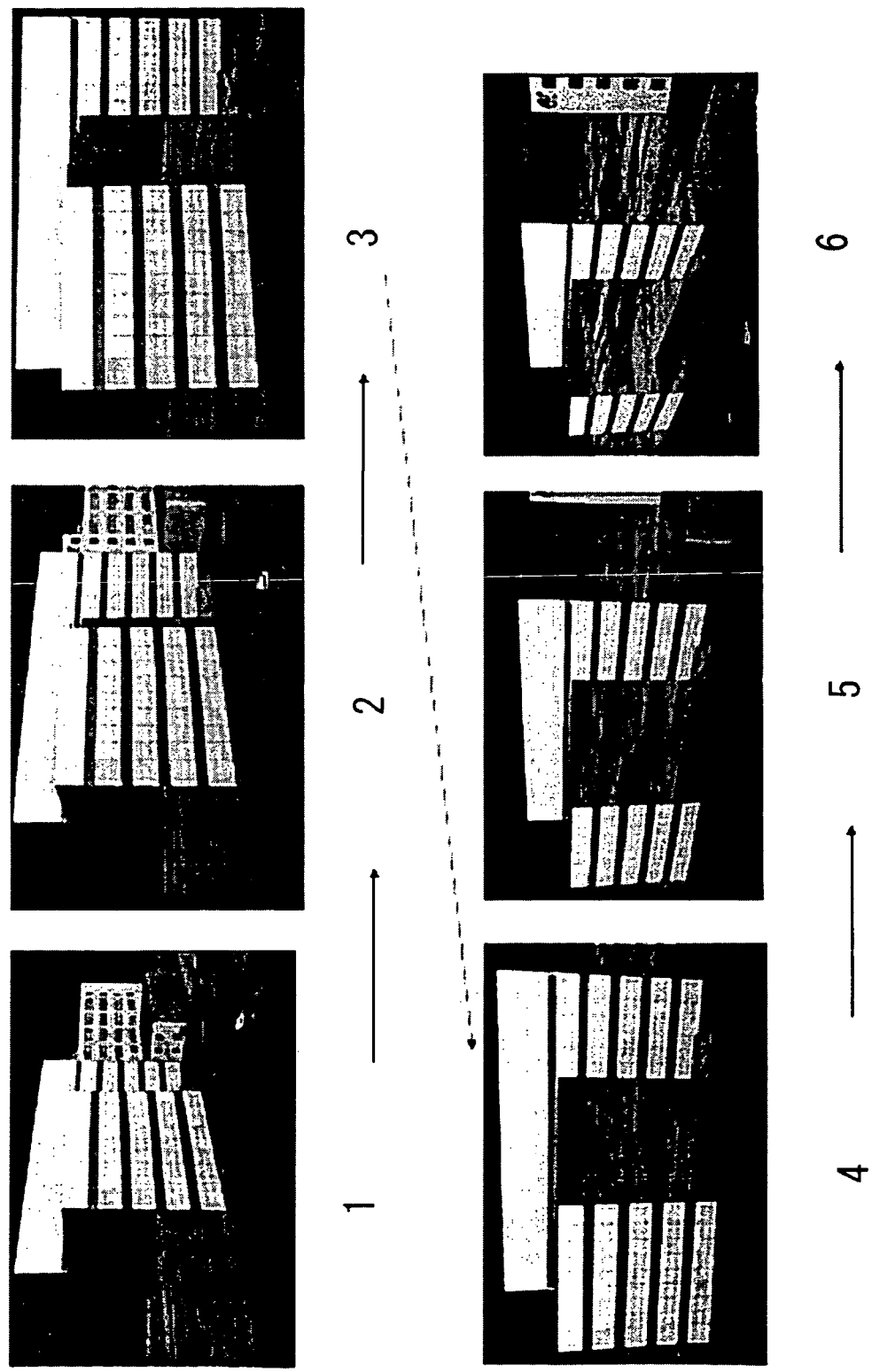
FIG. 10 shows exemplary visual images of an object as viewed from designated photographing positions.

FIG. 10 shows exemplary visual images of the object as viewed from the designated photographing positions displayed on the display screen for object model 149. In the figure, reference numerals 1-6 correspond to the designated photographing positions 1-6 of FIG. 6. When designated photographing positions 1-6 are entered on the photographing position entry screen 148, 3D images of the object as viewed from the designated photographing positions 1-6 and at an angle toward the photographing section 110 are formed and displayed on the display screen for object model 149.

Figure 11:
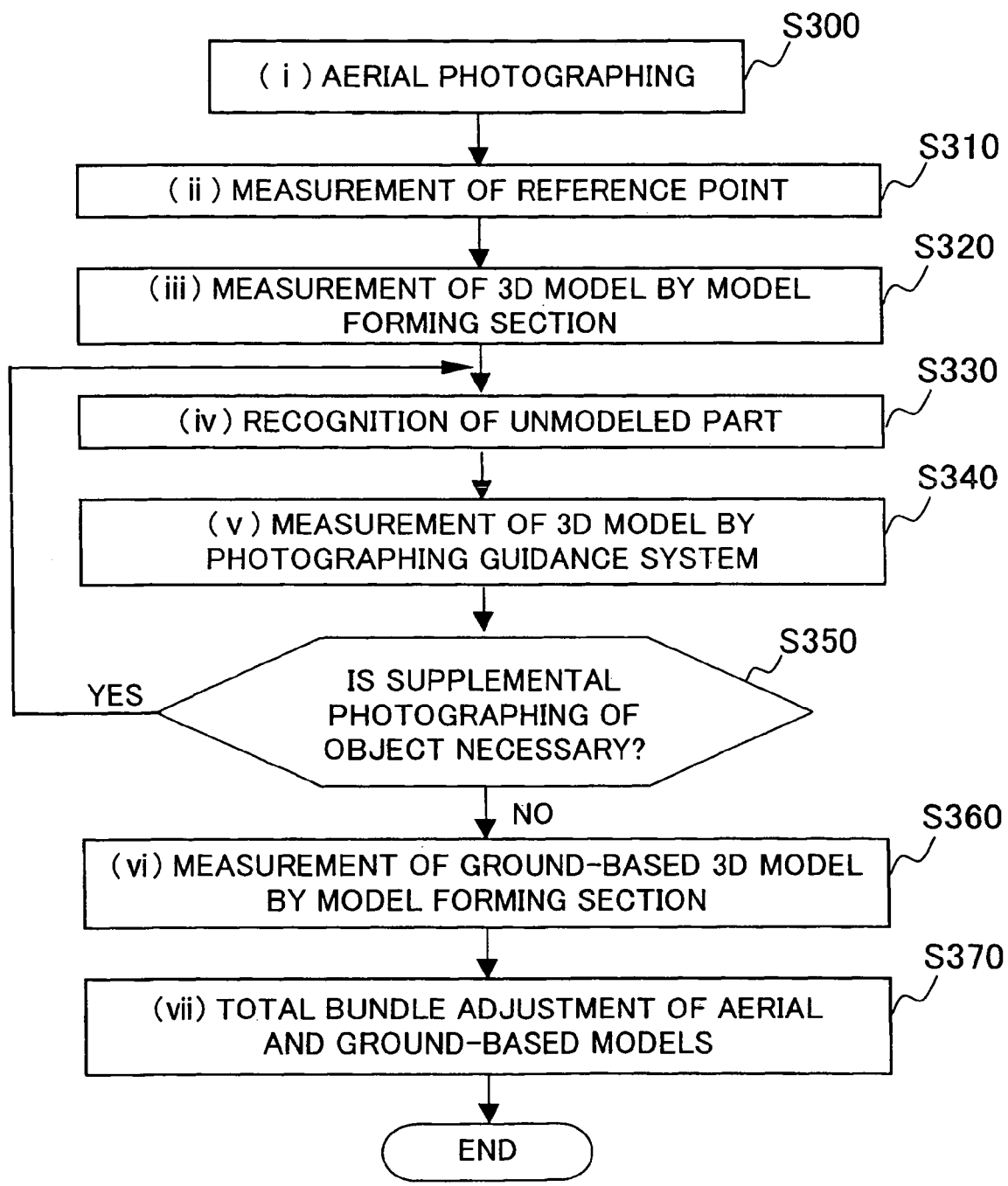
FIG. 11 is a flowchart illustrating measurement of a 3D model using images photographed from the air and on the ground.

The photographing work with the apparatus configured as described above will be described. FIG. 11 is a flowchart illustrating the measurement to form a 3D model using images photographed from the air and on the ground. Aerial photographing is first performed (S300). The aerial-photographed image may be of various kinds, such as aerial photographs (for example provided by the Geographical Survey Institute), those obtained with a photographing system on a helicopter, airship, balloon, etc., and those image data captured using a paraglider with an engine. Note that the internal orientation elements under the photographing conditions of the photographing section 110 need to be known.

Now, on the ground, reference points necessary to generate a 3D model are obtained with a measuring instrument or a GPS (S310). In this event, measurement values with a measuring instrument should be represented in terms of a global positioning coordinate system via a GPS for uniformity. Using the aerial-photographed image obtained in S300, the model forming section 155 performs a measurement for forming a 3D model of the object 10 (S320). In this event, the reference points obtained in S310 may be used as appropriate, and three-dimensional model data generated by the model forming section 155 based on the aerial-photographed image are stored in the image data storage section 130.

The recognition section 150 recognizes an unmodeled part of the object 10 based on the three-dimensional model data stored in the image data storage section 130 (S330). Using a virtual guiding system, the photographing section 110 performs ground-based photographing (S340). In this event, the photographing section 110 may preferably photograph the unmodeled part of the object 10 recognized by the recognition section 150 using photographing instruction information obtained by the photographing instruction information section 160. Before this step, the reference points measured in S310 and the 3D model data generated in S320 should be stored beforehand in the virtual guiding system. This allows the monitor image display section 142 to display in real time an object image at an angle oriented by the photographing section 110, with the reference points obtained by the measurement in S310 displayed as superimposed over the object image, while the photographing positions are confirmed. The model display section 144 displays the 3D model generated in S320 at an angle as viewed through the photographing section 110. The measurement condition display section 146 allows confirmation of the measurement accuracy and/or the overlapping state relating to the monitor image display section 142. These functions allow the photographer to bring the photographing section 110 to a most suitable photographing position where a post process such as 3D model generation is in view.

The model forming section 155 performs a stereo measurement on the image photographed using the virtual guiding system, to generate a ground-based 3D model (S340). It is determined based on the 3D model generated in S340 whether or not supplemental photographing of the object 10 is necessary (S350). The determination of the necessity for supplemental photographing may preferably be based on the recognition of an unmodeled part by the recognition section 150, and should take into account the difference in resolution between the aerial-photographed image and the ground-photographed image. When supplemental photographing of the object 10 is necessary, the process returns to S330. On the other hand, when supplemental photographing of the object 10 is not necessary, the process proceeds to S360.

The model forming section 155 generates an overall 3D model (S360). At this time, the model forming section 155 performs simultaneously bundle adjustments on the pass points and the tie points in each stereo model image photographed from the air or on the ground (S370), to thereby uniform the coordinate systems between the stereo model images photographed from the air or on the ground and hence to generate an overall 3D model. Note that the virtual guiding system can automatically form a ground-based 3D model and generate an overall 3D model for each stereo model image photographed from the air or on the ground, while performing bundle adjustments. According to the flowchart of FIG. 11, S370 is performed after S360. However, S360 and S370 may be performed simultaneously.

Figure 12:
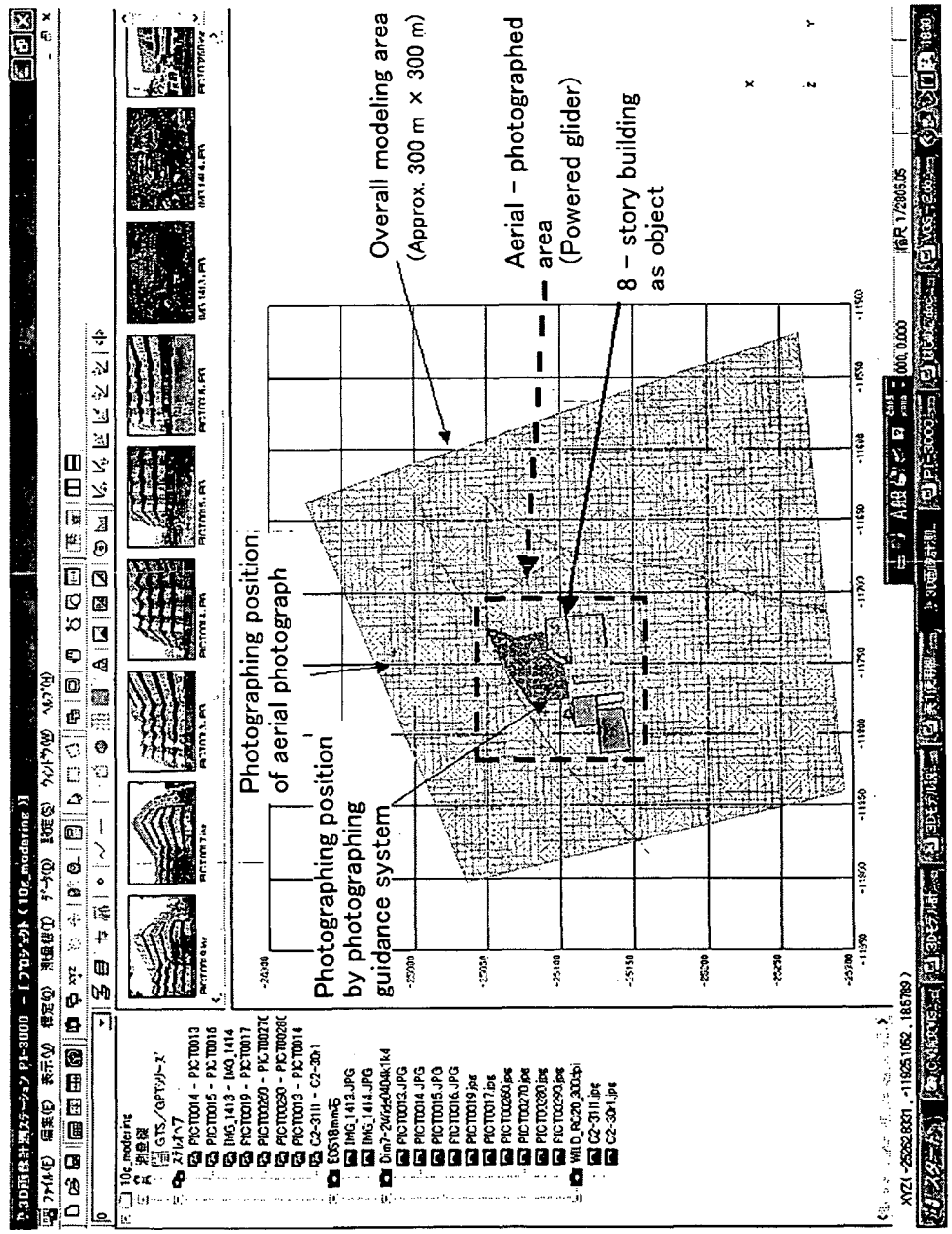
FIG. 12 shows an overall site plan of the object for 3D model generation using a virtual guiding system according to the present invention.

Now, a description will be made of an example of 3D model generation based on aerial photographs, air images and ground-based images using the foregoing virtual guiding system according to the present invention. FIG. 12 shows an overall site plan of the object for the 3D model generation using the virtual guiding system according to the present invention. The object is an 8-story building owned by TOPCON Corporation, located at the place of registration of the main office of TOPCON Corporation. The used images include an aerial photograph (FIG. 13) as basic image information on the overall object, images photographed by the photographing section 110 on a powered glider (FIG. 15) to model the object from the air, and those of ground-level side surfaces of the object (FIG. 18) obtained with the photographing section 110 of the virtual guiding system. These three types of images are merged and formed into a 3D model by the model forming section 155. The reference points are obtained by measuring the side surfaces of the building as an object with a measuring instrument, and converting their positions measured by the measuring instrument into GPS coordinates using GPS-measured points within the site of the object.

The respective processes of photographing and analysis will be described below.

(1) Base Generation by Aerial Photograph Analysis

Figure 13:
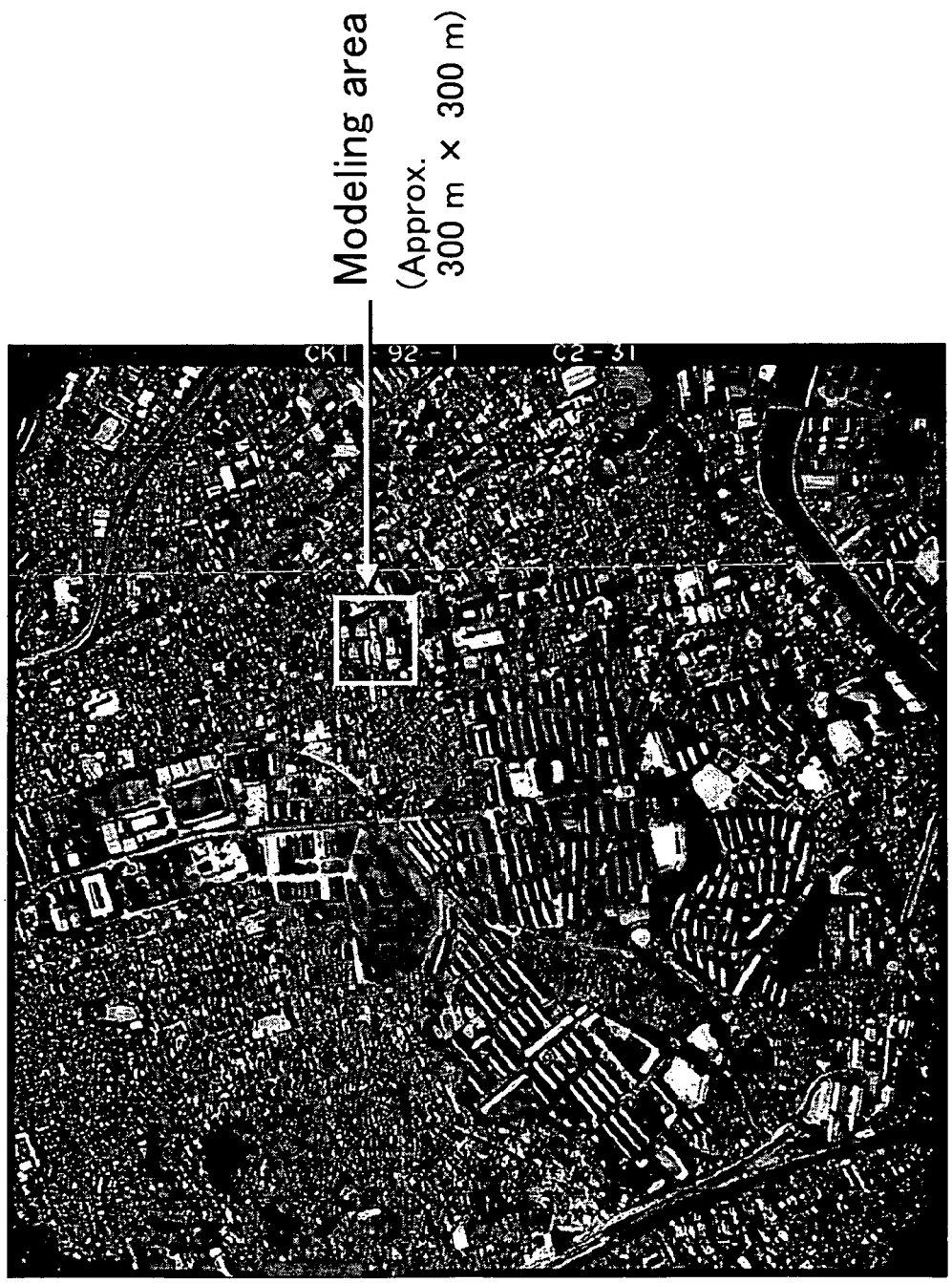
FIG. 13 is an aerial photograph of about 4 km square around Itabashi Ward, Tokyo, including the location where the main office of TOPCON Corporation is registered, provided by the Geographical Survey Institute.

FIG. 13 is an aerial photograph of about 4 km square around Itabashi Ward, Tokyo, including the location where the main office of TOPCON Corporation is registered, provided by the Geographical Survey Institute. The camera for photographing may be a general one for aerial photographing purposes. The focal length, view angle, etc., may be selected as required for photographing.

Figure 14:
FIG. 14 shows a modeled image of an object area for 3D model generation by a model forming section.

FIG. 14 shows a modeled image of an object area for 3D model generation by the model forming section. In order to use the aerial photograph as a base (foundation) for the analysis of the 3D model generation object area, the film is scanned with a scanner at a resolution of, for example, 600 dpi, and the scanned data is subjected to an interior orientation by the model forming section 155. It should be appreciated that stereo matching is not performed but a simple way of forming a 3D image is used in FIG. 14. However, if the object includes ups and downs such as mountains, a part of the 3D model generation object area including the ups and downs may preferably be subjected to a stereo matching process to form a 3D model.

(2) 3D Model Generation Using Aerial-Photographed (Powered Glider) Images

Figure 15:
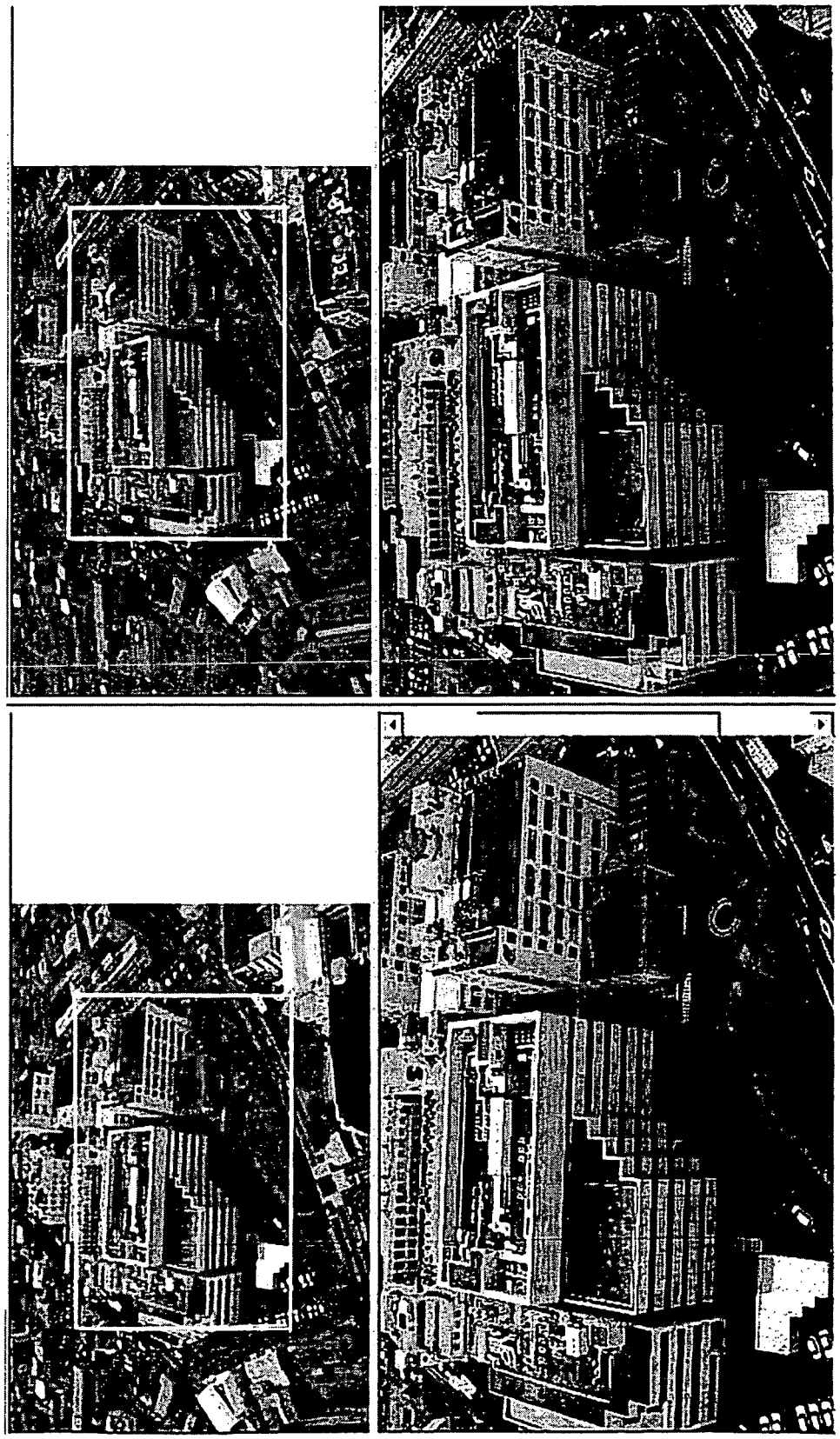
FIG. 15 shows images photographed with a photographing section 110 on a powered glider to model the object from the air.
Figure 16:
FIG. 16 illustrates photographing from a powered paraglider (paraglider with an engine).

FIG. 15 show images photographed with the photographing section 110 on a powered glider to model the object from the air. FIG. 16 illustrates photographing from a powered paraglider (paraglider with an engine). Different from airplanes, powered paragliders are not subject to restrictions regarding altitude, etc., and provide inexpensive and safe photographing. Aside from powered gliders, helicopters, balloons, light airplanes that allow large-scale aerial photographing, and the like may also be used. Digital cameras for civilian use may be used as the camera for photographing.

Figure 17:
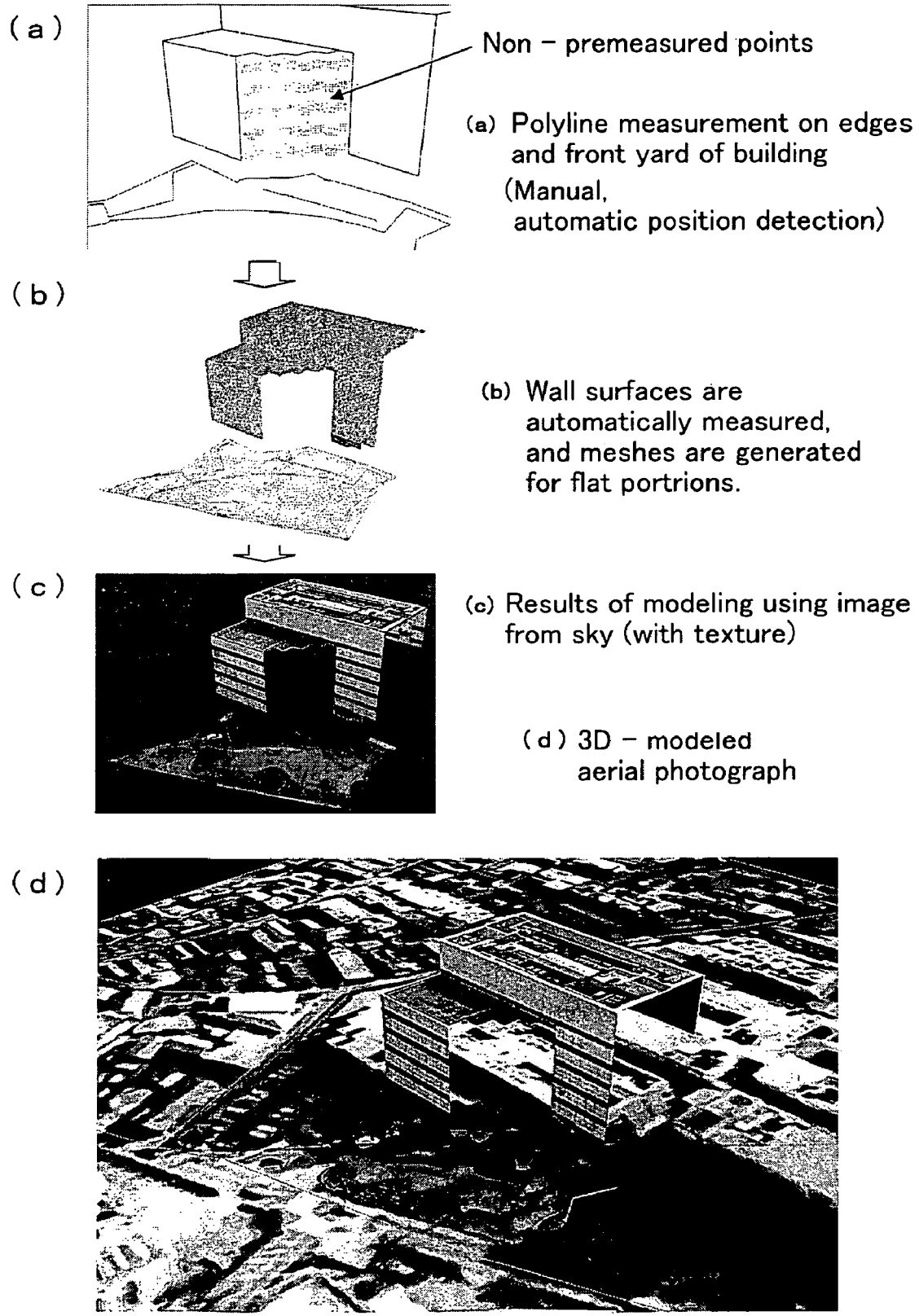
FIG. 17 illustrates an exemplary process of forming a 3D model using the aerial photograph.

FIG. 17 illustrates an exemplary process of forming a 3D model using the aerial photograph. The procedures for analysis to form a 3D model are as follows. The model forming section 155 determines the orientation using the reference points obtained by measurement with a measuring instrument, and performs a polyline measurement on the edges and the front yard of the building as an object (FIG. 17a). Here, the polyline measurement refers to a three-dimensional measurement performed manually or through automatic position detection, in which corresponding points are designated manually or measured semi-automatically using a correlation process. The wall surfaces of the building as an object are automatically measured, and meshes are generated for its flat portions (FIG. 17b). The external shape of the building as an object is displayed (FIG. 17c). Preferably, the building as an object may be displayed with texture attached, as in a second embodiment, giving it an enhanced feel. The external shape of the building that has been formed into a 3D model is integrated with the aerial photograph to be merged with general image information on the area around the object (FIG. 17d). At this time, a part of the wall surfaces of the building as an object has not been photographed because of the restrictions related to aerial photographing, and therefore is missing in the 3D model.

(3) Addition of Ground-Based 3D Model from Virtual Guiding System

FIG. 18 shows the scene of photographing the object with the photographing section 110 from an appropriate supplemental direction, and additional images photographed. In this event, the display screen of the virtual guiding system is as shown in FIG. 4, for example. The monitor image display section 142 displays an image of the object as viewed from an appropriate supplemental photographing direction. Although a part of the wall surfaces of the building as an object has not been photographed because of the restrictions related to aerial photographing, photographing from an appropriate supplemental direction allows obtaining the missing wall surface image information with precise reference point information.

Second Embodiment

Figure 19:
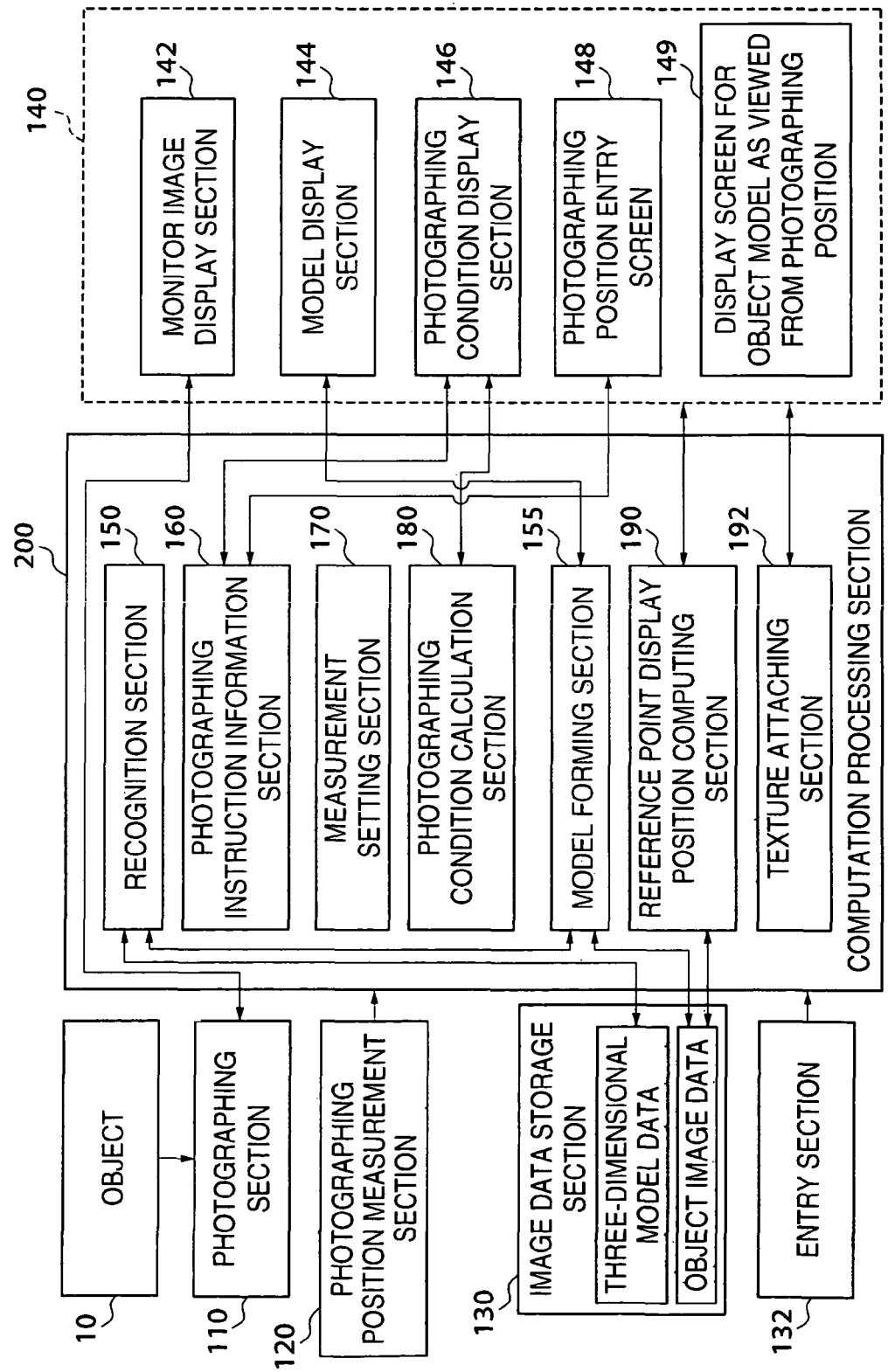
FIG. 19 is a general block diagram illustrating the functionality of a second embodiment of the present invention.

FIG. 19 is a general block diagram illustrating the functionality of a second embodiment of the present invention. Components in FIG. 19 having the same functions as those in FIG. 1 are given the same reference numerals, and their descriptions will not be repeated. As shown in the figure, the image data storage section 130 stores three-dimensional model data and object image data of the object 10. Here, the three-dimensional model data refer to data in which positional data of points of the object have been obtained, for example with a measuring instrument or a laser scanner. The object image data refer to mere image data in which no positional data of points have been obtained. The model forming section 155 forms the three-dimensional model data of the object 10 using the object image data. A texture attaching section 192 divides the three-dimensional model data of the object 10 into plural areas, and attaches texture of the object image data to each divided area based on the relationship between each divided area and the photographing direction.

Figure 20:
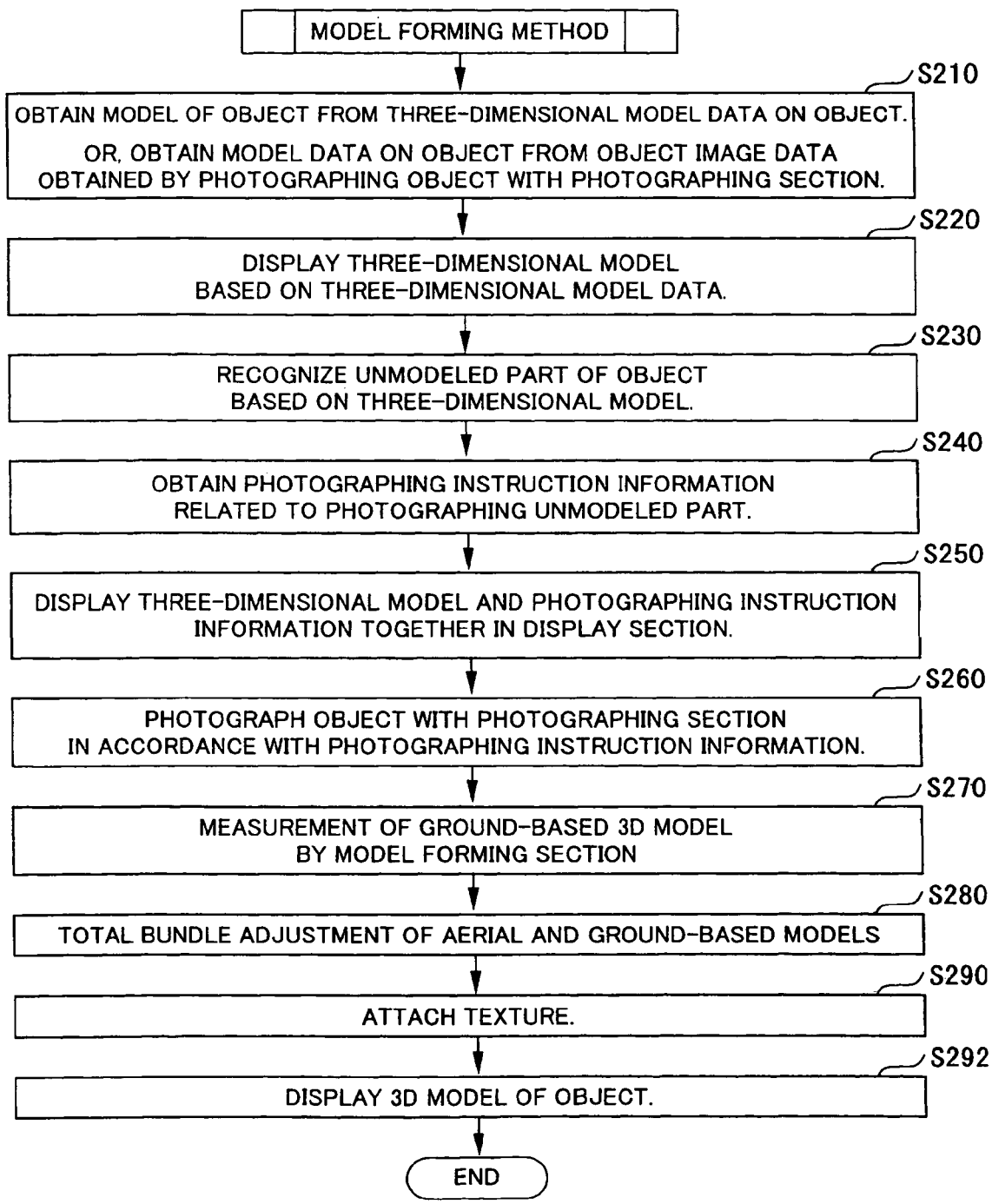
FIG. 20 is a flowchart illustrating a second model forming method of the present invention.

FIG. 20 is a flowchart illustrating the second embodiment of the present invention. The model forming section 155 obtains model data of the object 10, using the three-dimensional model data of the object 10 stored in the image data storage section 130 and as necessary the object image data obtained by photographing with the photographing section 110 (S210). The model display section 144 displays a three-dimensional model based on the three-dimensional model data of the object 10 (S320).

The recognition section 150 recognizes an unmodeled part of the object 10 based on the three-dimensional model data of the object 10 (S230). The photographing instruction information section 160 obtains photographing instruction information related to photographing the unmodeled part (S240). The display section 140 displays the three-dimensional model and the photographing instruction information together (S250). That is, the model display section 144 displays the three-dimensional model while the measurement condition display section 146 displays the photographing instruction information. The object 10 is photographed with the photographing section 110 in accordance with the three-dimensional model and the photographing instruction information displayed in the display section 140 by the photographer (S260).

The model forming section 155 generates an overall 3D model (S270). At this time, the model forming section 155 performs simultaneously bundle adjustments on the pass points and the tie points in each stereo model image photographed from the air or on the ground (S280), to thereby uniform the coordinate systems between the stereo model images photographed from the air or on the ground and hence to generate an overall 3D model. That is, according to the flowchart of FIG. 20, S280 is performed after S270. However, S270 and S280 may be performed simultaneously. The texture attaching section 192 attaches texture of the object image data to each divided area of the three-dimensional model data of the object 10 based on the relationship between each divided area and the photographing direction (S290). A three-dimensional model of the object is displayed using the object image data with texture attached (S292).

Figure 21:
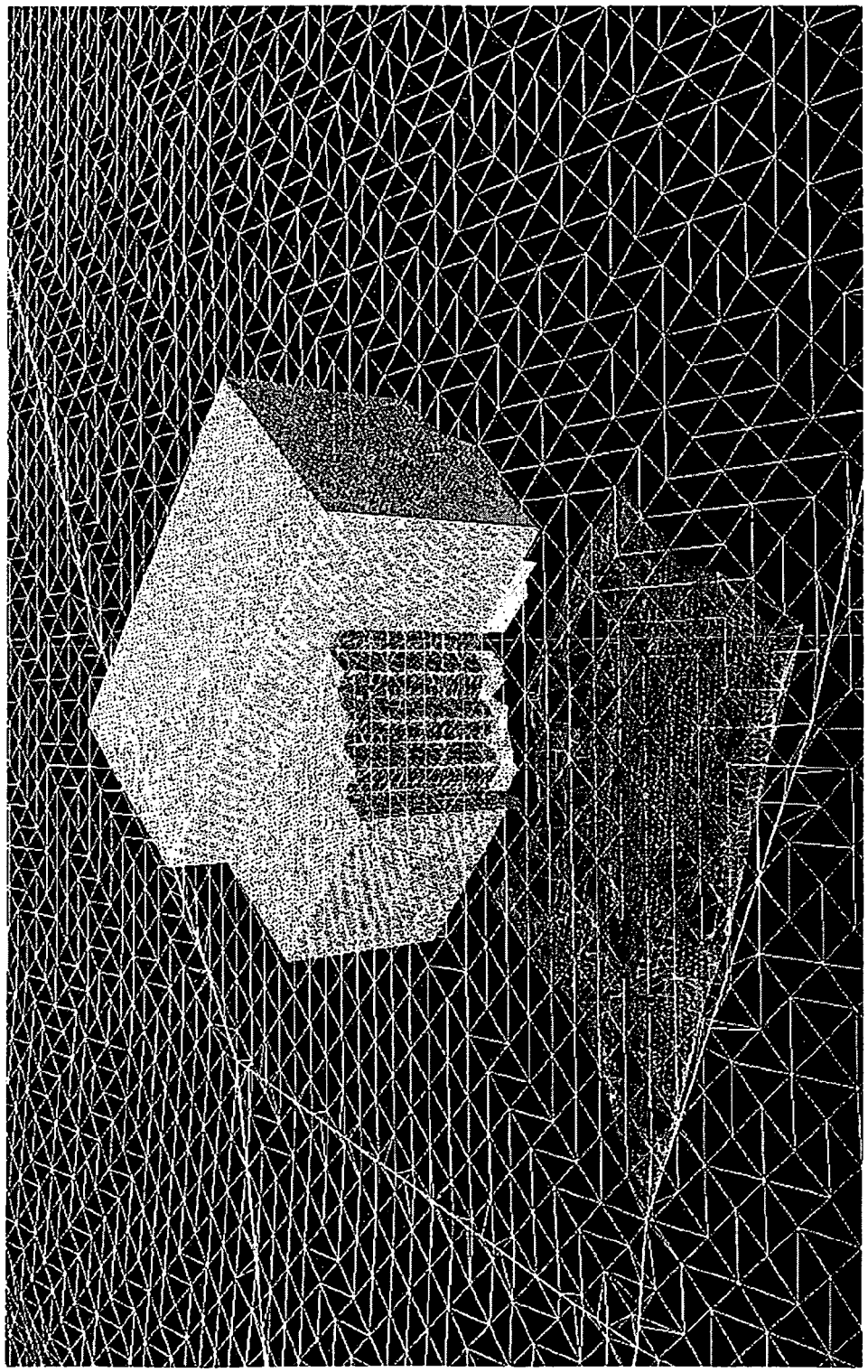
FIG. 21 shows an image of the object in which wireframes are attached to an aerial photograph.
Figure 22:
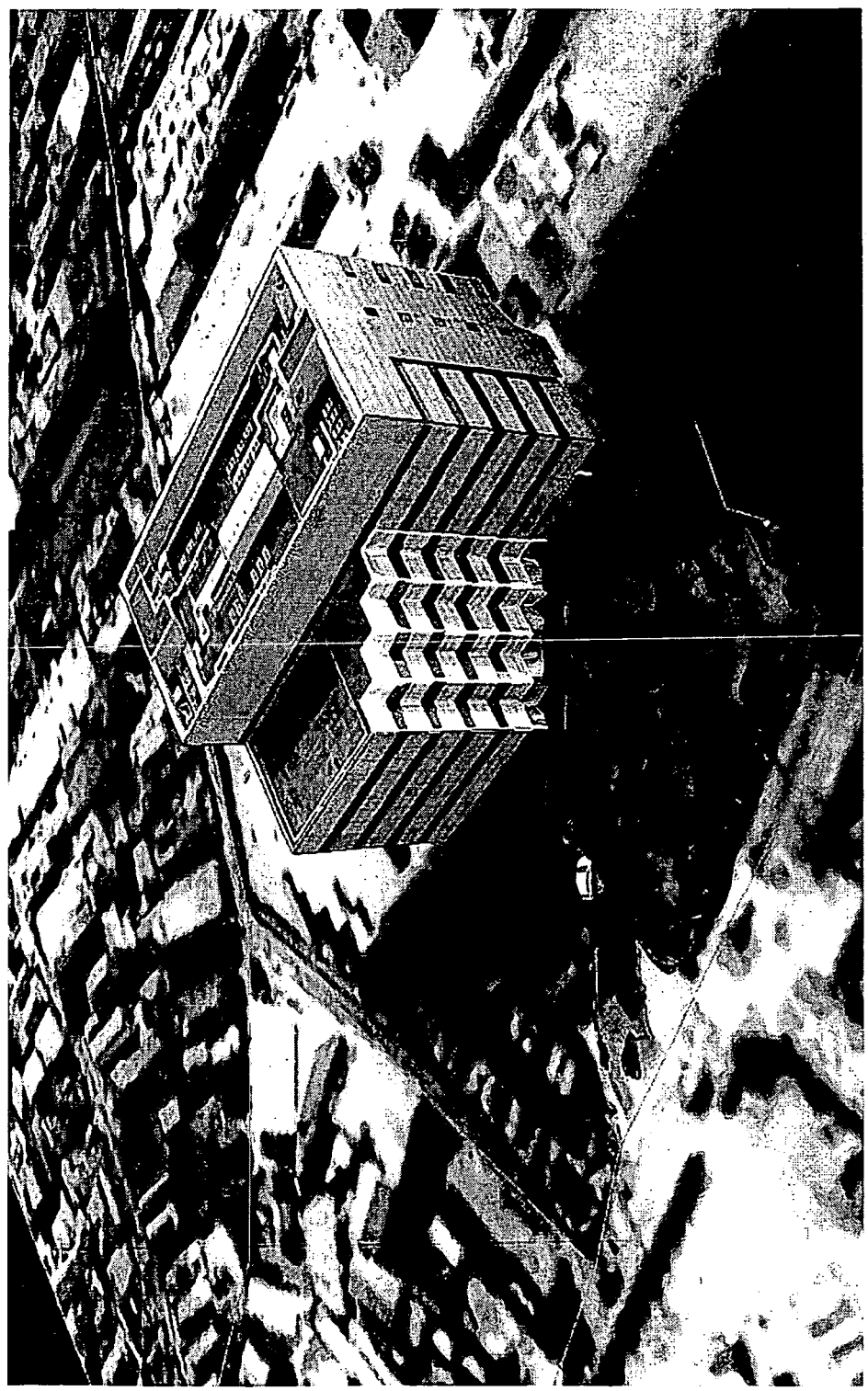
FIG. 22 shows an image of the object in which texture is attached to the aerial photograph.

FIG. 21 shows an image of the object in which wireframes are attached to the aerial photograph. FIG. 22 shows an image of the object in which texture is attached to the aerial photograph. Here, the texture and the wireframes are obtained from the 3D model obtained by the model forming section 155 from the ground-based images supplemented by the virtual guiding system. The texture is a term used in the graphics field and so on, and refers to what is drawn on a surface of a figure to express a pattern and a feel of a substance. The texture is used to give a stereoscopic effect to a two-dimensional image of an object. The wireframes compose a diagram of polygonal line segments, for example connecting the vertexes of a multitude of polygons, such as triangles, representing the surface shape of an object. A part of the wall surfaces of the building as an object has not been photographed because of the restrictions related to aerial photographing. By photographing the object from an appropriate supplemental direction with the virtual guiding system and then forming a 3D model with the photographed image of the object obtained, the entire object can be subjected to a 3D modeling process.

Figure 23:
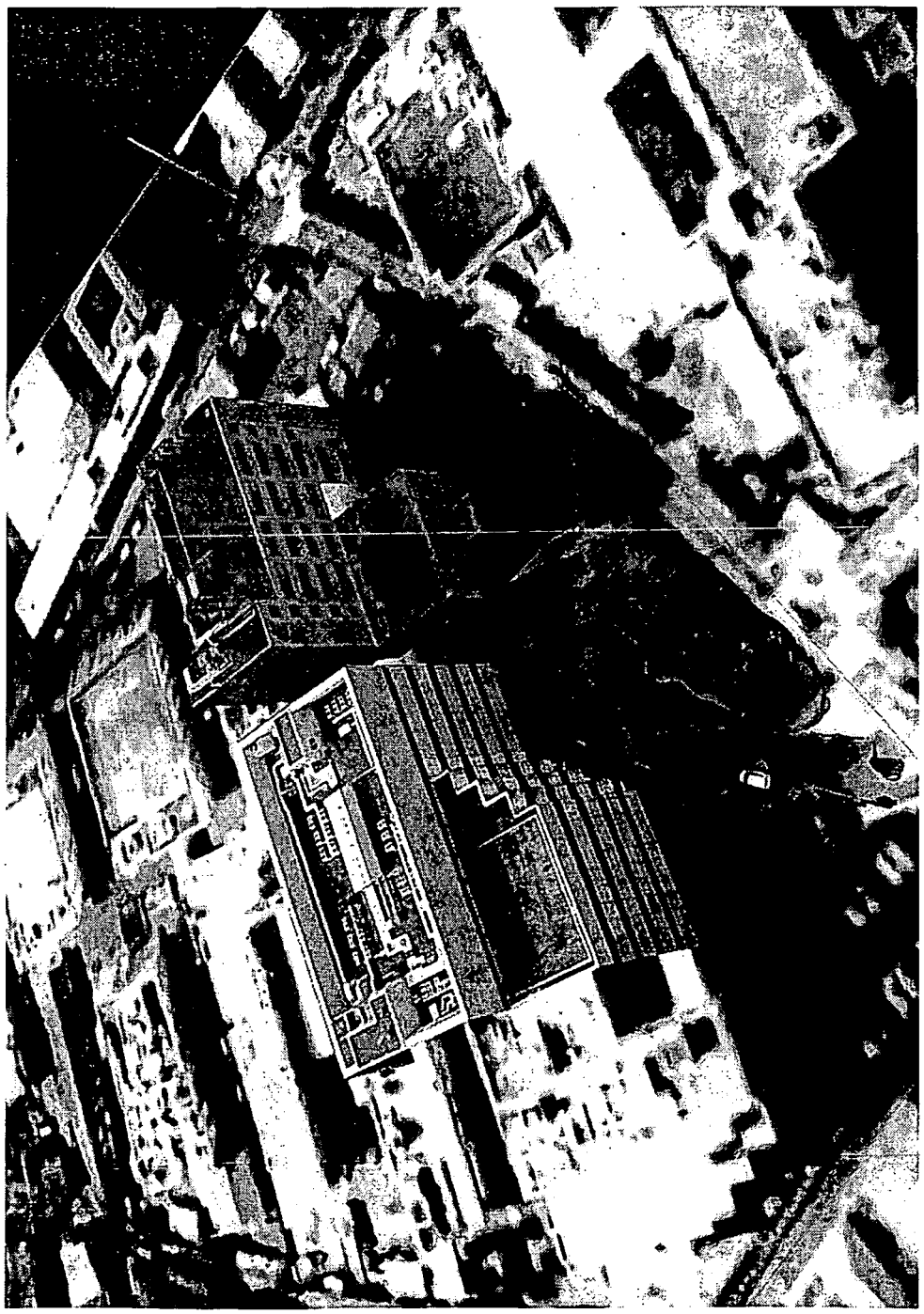
FIG. 23 illustrates a 3D model with a building adjacent to the object added.

FIG. 23 illustrates the 3D model added with a building adjacent to the object. The building adjacent to the object has been added after the 3D modeling process for the entire object as shown in FIG. 22 using the aerial-photographed image. In this manner, additional analysis using the virtual guiding system or air images or aerial photographs can easily handle a part desired to be supplemented or added in the 3D modeling process.

Figure 2:
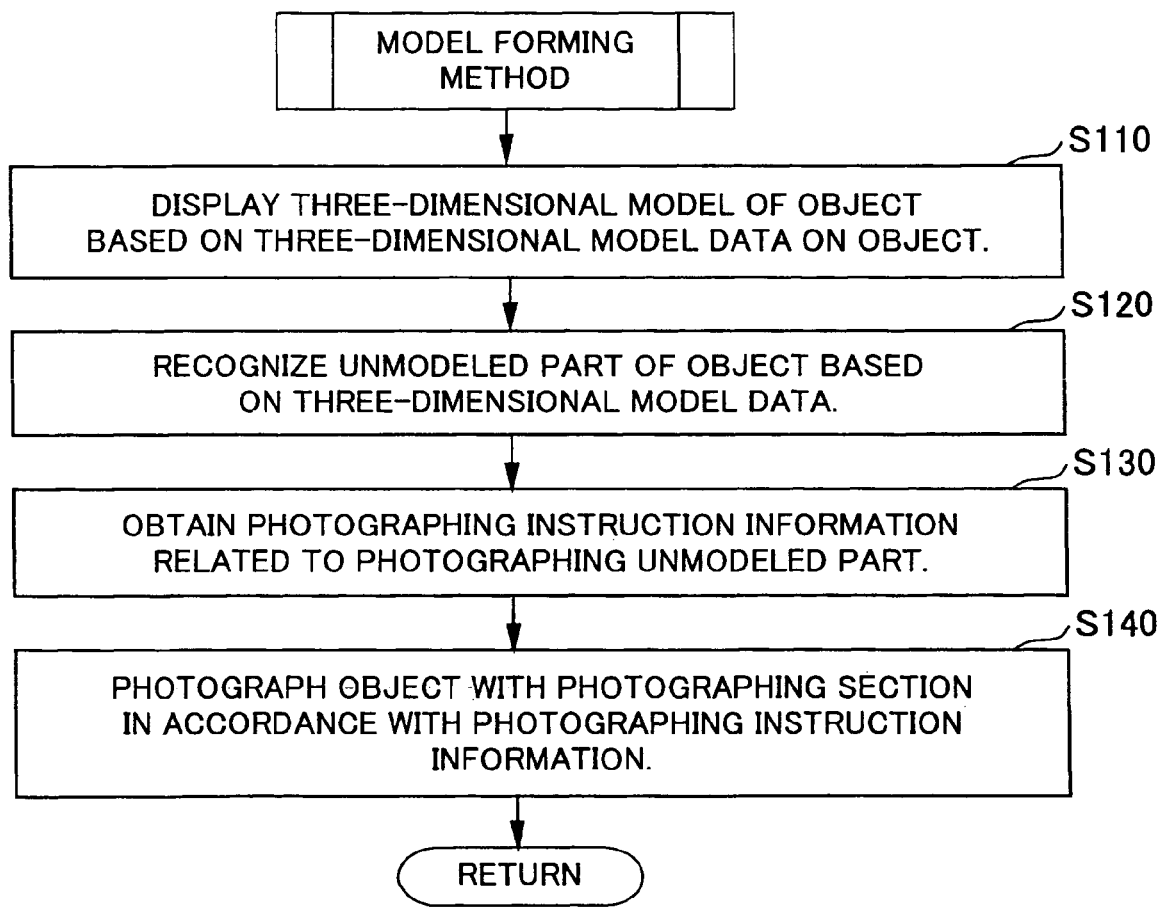
FIG. 2 is a flowchart illustrating a first model forming method of the present invention.

Now, a description will be made of a recognition process by the recognition section 150 of recognizing an unmodeled part of the object based on the three-dimensional model data. The recognition process by the recognition section 150 is described in step S120 of FIG. 2 and step S230 of FIG. 20. Here, an automatic recognition process will be described. Note, however, that an unmodeled part of the object (an architecture) may be designated on the display 140 via a user interface for calculation.

Figure 24:
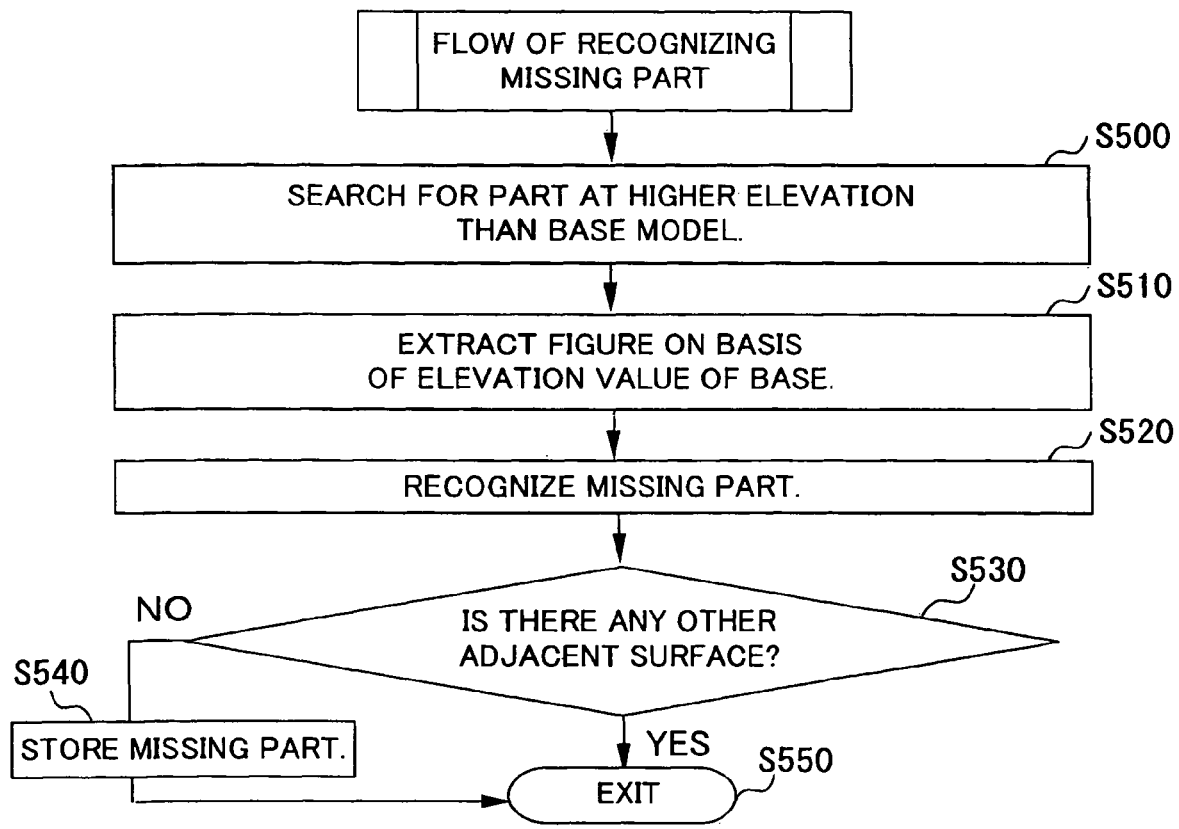
FIG. 24 is a flowchart of the recognition of a missing part.

FIG. 24 is a flowchart of the recognition of a missing part. The recognition section 150 searches for a part at a higher elevation than a base model (S500). For example, in the first embodiment, FIG. 14 corresponds to a 3D model as the base model generated from an aerial photograph. A 3D model generated by superimposing a building over the base model is as shown in FIG. 17(d). Since they are 3D models, a part at a higher elevation than the base part corresponds to an architecture.

Figure 25:
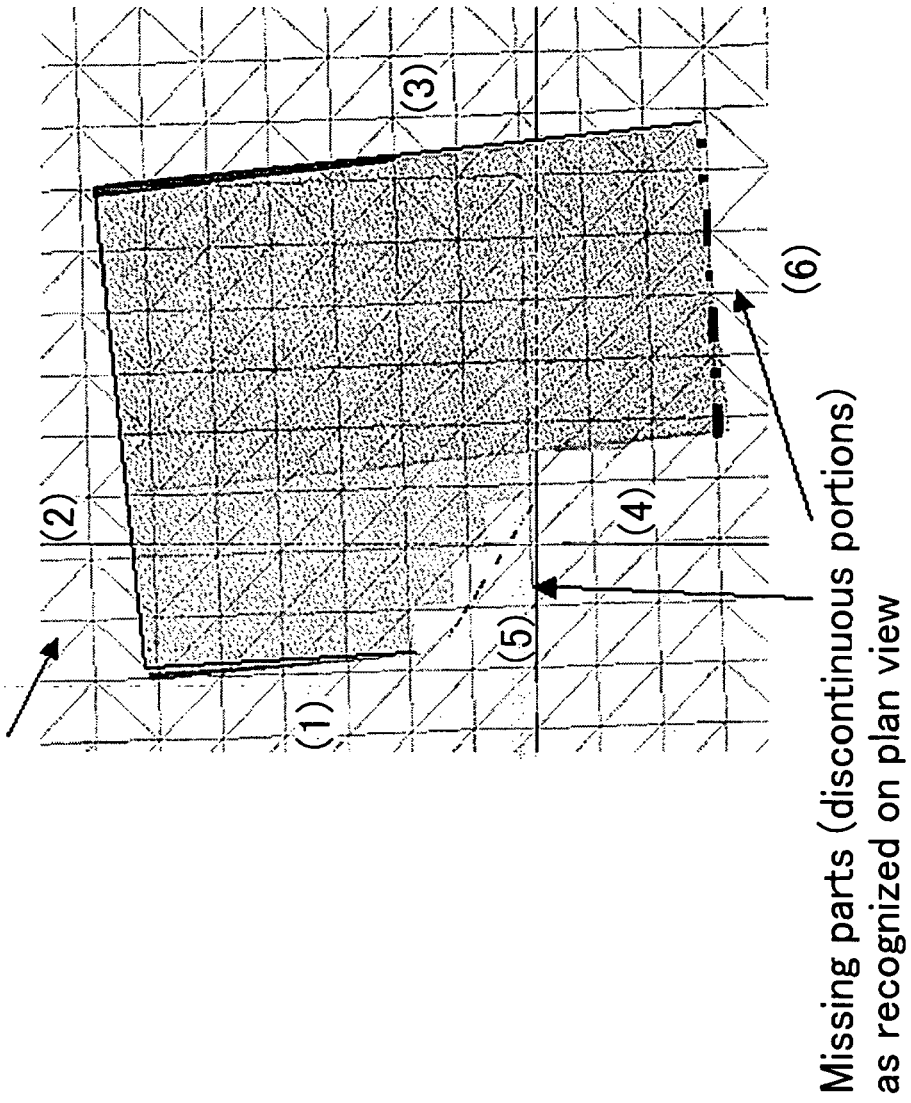
FIG. 25 is a plan view showing missing parts when the object (an architecture) is extracted.

The recognition section 150 extracts a figure on the basis of the elevation value of the base (S510). That is, the recognition section 150 extracts a part with a higher elevation value than that of the base as a building based on the search results in S500. As a result, portions (1), (2), (3) and (4) of FIG. 25 are extracted as parts of a building.

The recognition section 150 recognizes a missing part in the base model generated from an aerial photograph. For an architecture, line segments connecting points with a higher elevation value than that of the base should inevitably be closed, and therefore any discontinuous portion should be a missing part. Thus, portions (5), (6) of FIG. 25 are recognized as missing parts. Although the processes from S500 to S520 solely allow recognition of a missing part in the base model generated from an aerial photograph, the next process of S530 may further be performed for more reliability.

Figure 26:
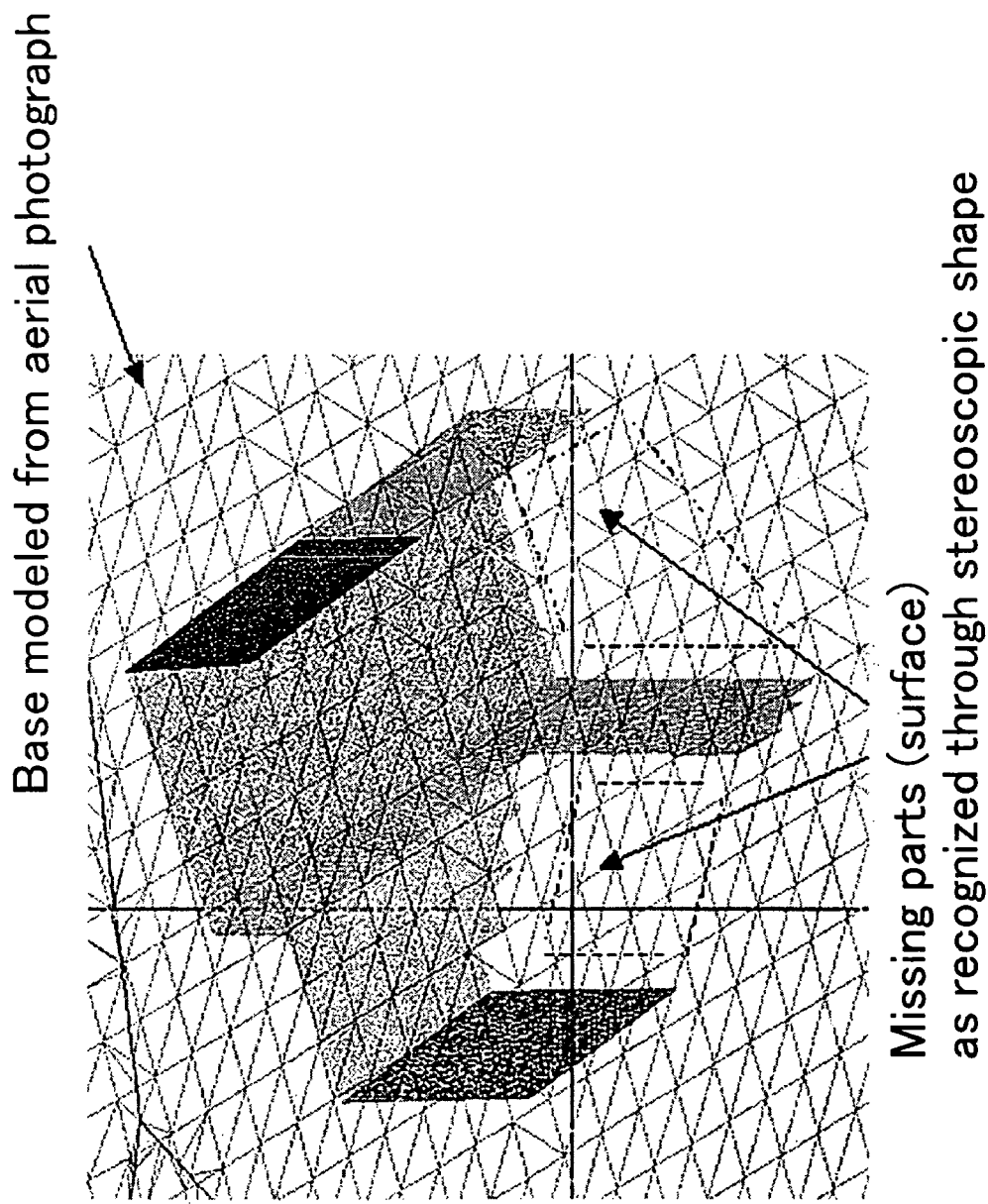
FIG. 26 is a 3D model view showing the missing parts when the object (an architecture) is extracted.

The recognition section 150 checks whether or not there is any adjacent surface to the part with a higher elevation value than the base extracted in S510 (S530). In this event, since the sides of the architecture are surfaces, the portions (1)-(4) of FIG. 25 are checked as to whether or not there is any such surface. FIG. 26 is a 3D model view illustrating the missing parts as recognized through the stereoscopic shape. The process of S530 allows recognition of missing areas corresponding to the portions (5), (6) of FIG. 25. One exemplary recognition process has been described above. Note, however, that the recognition section 150 may recognize a missing part in the base model generated from an aerial photograph in various processes.

Figure 27:
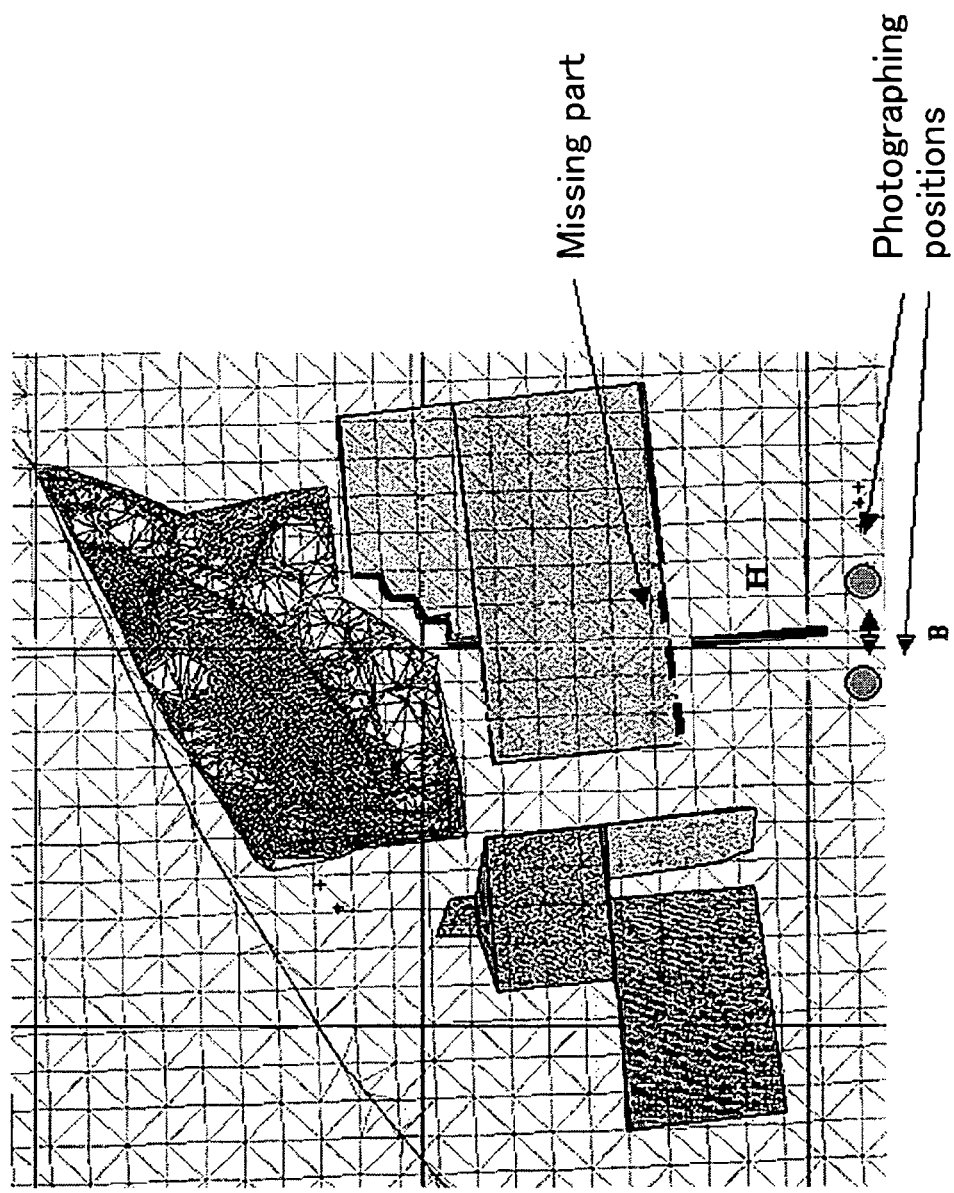
FIG. 27 is a plan view showing obtained photographing positions.

Now, the process of obtaining photographing information related to photographing the unmodeled part will be described. The process of obtaining photographing information is described in step S130 of FIG. 2 and step S240 of FIG. 20. In the generation of a 3D model, for example, when the required accuracy ($\delta xy$, $\delta z$) for modeling an architecture has been entered, the photographing distance of cameras H and the distance between the cameras B can be calculated by the following equations (3) and (4):

$$H = \delta xy \cdot f / \delta p \quad (3)$$

$$B = H \cdot H \cdot \delta p / (f \cdot \delta z) \quad (4)$$

where the focal length of the cameras f and the pixel resolving power $\delta p$ are known. The photographing position can be obtained as shown in FIG. 27 by determining the H and B along the line normal to the missing part.

Third Embodiment

Figure 28:
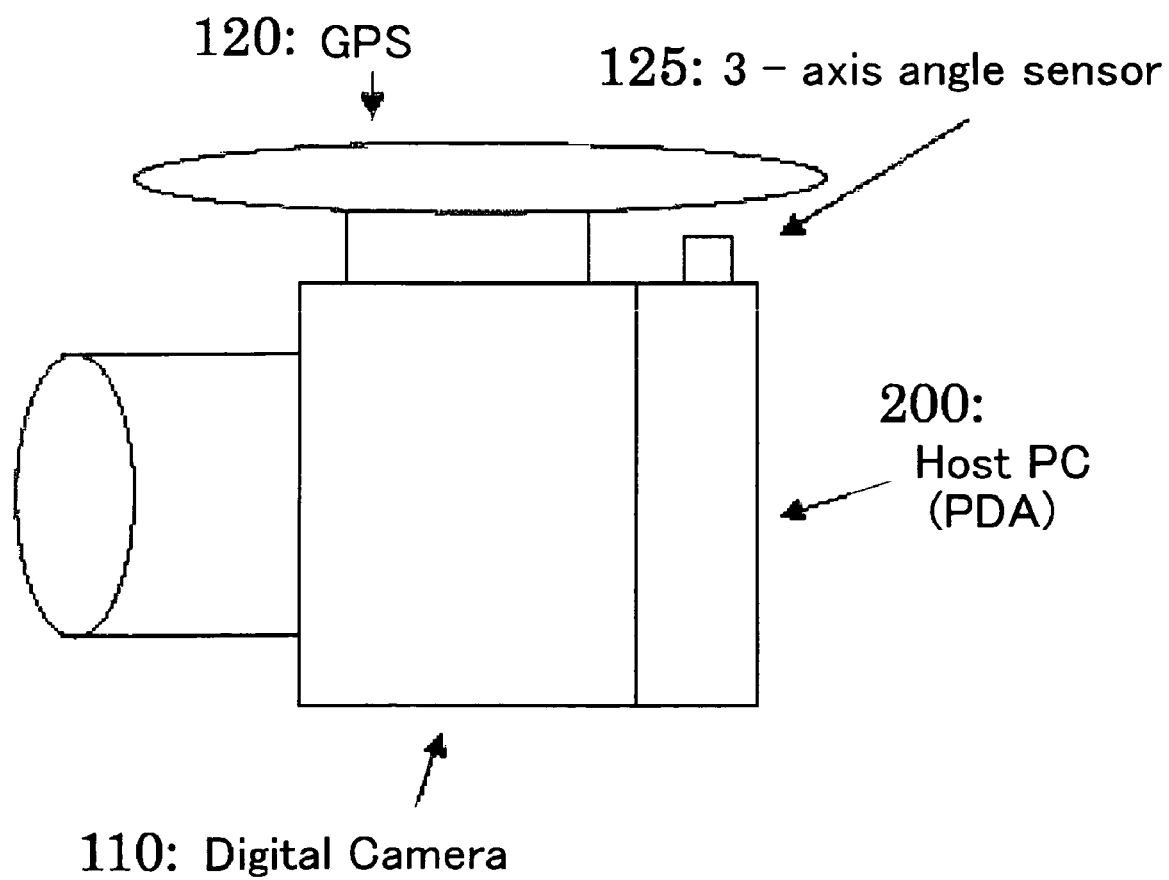
FIG. 28 is a general diagram illustrating the constitution of a third embodiment of the present invention.

FIG. 28 is a general diagram illustrating the constitution of a third embodiment of the present invention. In the first embodiment, a digital camera and a laptop computer are used in combination as shown in FIG. 3. In the present embodiment, however, a GPS, a digital camera and a small-sized host PC are constituted integrally. The small-sized host PC may be implemented by, for example, a portable information processing terminal such as a PDA. The functions of the GPS, digital camera and small-sized host PC are the same as those described in relation to the first embodiment, and their detailed descriptions will not be repeated.

As has been described above, in the bundle adjustment of an aerial photograph and an image photographed on the ground with the photographing section 110 of the virtual guiding system, it is important to supplement image data of the object by photographing from a missing direction. According to the present embodiment, the recognition section 150 can recognize a missing photographing direction for the object, and the photographing instruction information section 160 can present what needs to be noted in supplemental photographing from the missing direction. This allows efficient 3D model construction from the air and on the ground. Also according to the present embodiment, images photographed with a photographing section 110 of various types and at various resolutions can be subjected to a collective bundle adjustment, securing consistency among image measurement data of various kinds. Further, a textured 3D model can be generated using DSM (Digital Stereo Matching) data obtained by measurement through high-accuracy stereo matching, and displayed as viewed from any viewpoint and at various resolutions.

Fourth Embodiment

Figure 29:
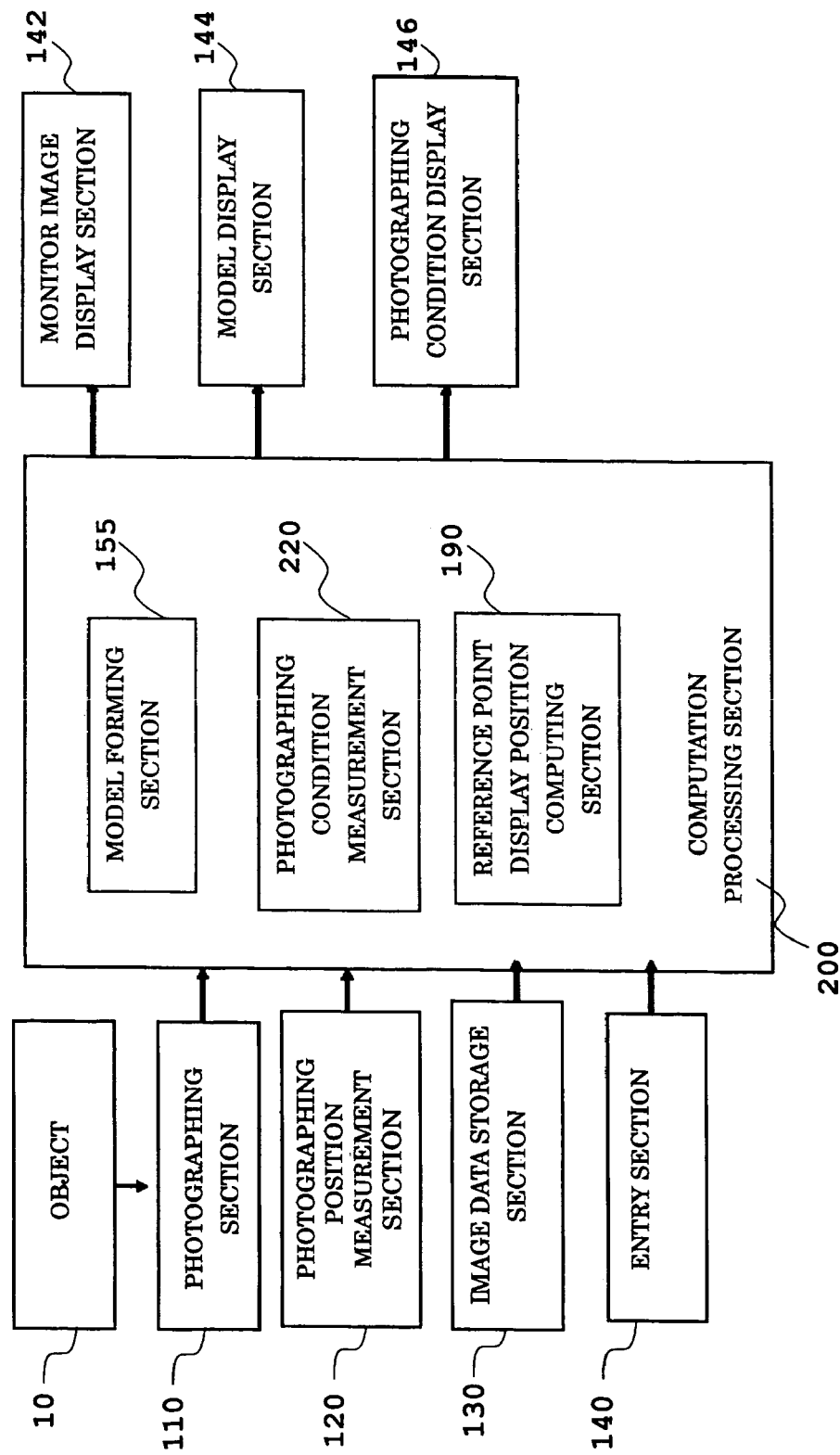
FIG. 29 is a general block diagram illustrating the functionality of a photographing apparatus as a fourth embodiment of the present invention.
Figure 30:
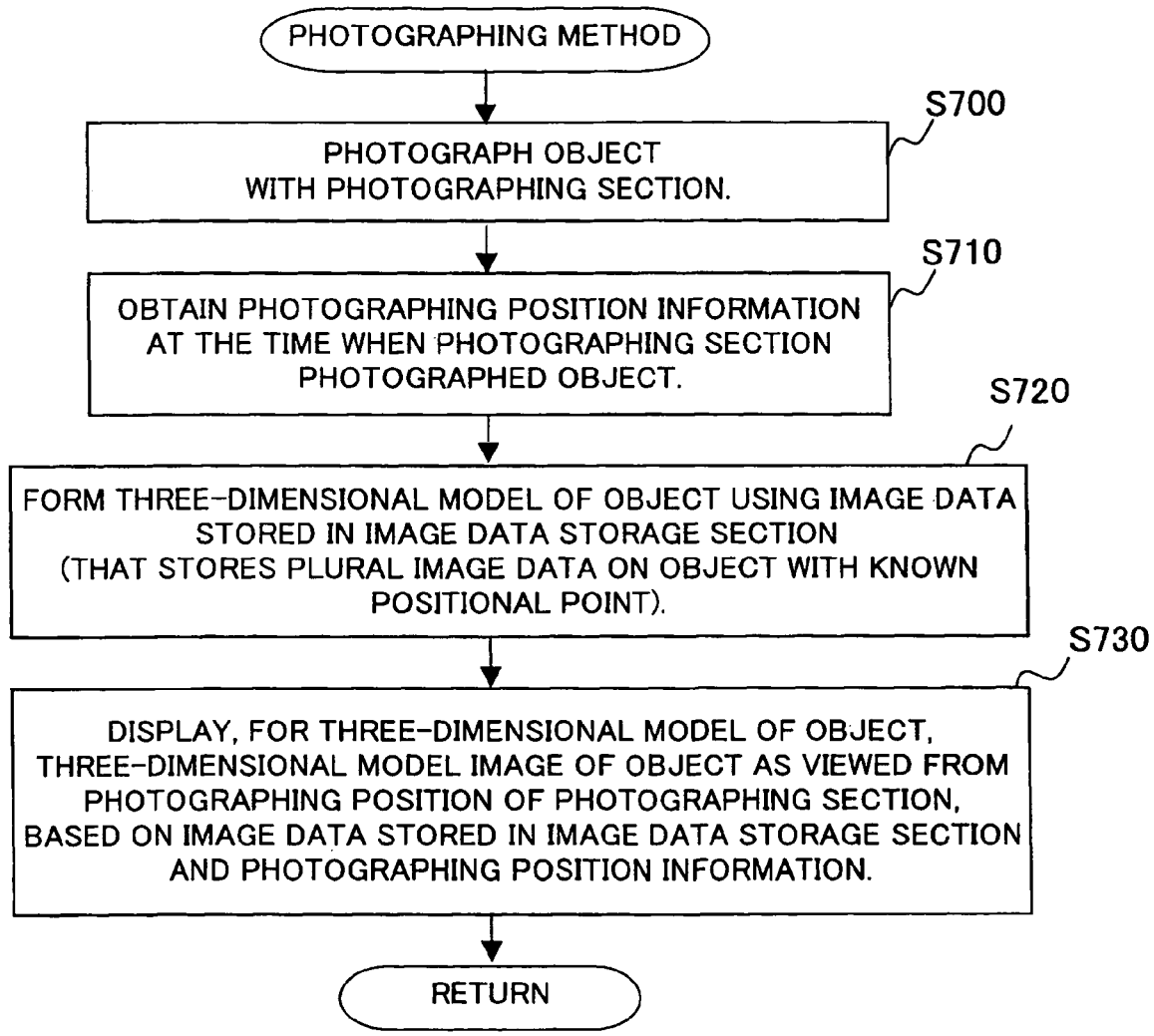
FIG. 30 is a flowchart of a fourth photographing method of the present invention.

FIG. 29 is a block diagram illustrating the functionality of a photographing apparatus as a fourth embodiment of the present invention. The general construction of the apparatus is the same as shown in FIG. 3 which has been used to describe the first embodiment. An object 10 is a tangible substance such as a measuring object or manufacturing object, and may be, for example, a structure of various kinds such as an architecture included in the field of city planning, construction, maintenance or a cultural property, a person, or a landscape. In the figure, a photographing apparatus of the present invention includes a photographing unit housing 100, a photographing section 110, photographing position measurement sections 120, 125 for obtaining information on the photographing position of the photographing section 110, an image data storage section 130 for storing plural image data of the object 10 with known positional points, a monitor image display section 142, a model display section 144, a measurement condition display section 146 and a computation processing section 200. The photographing apparatus may be called, for example, a virtual guiding system as described previously.

The computation processing section 200 may be implemented by, for example, a general-purpose laptop computer, and receives the image information obtained by photographing with the photographing section 110, and the position information (X, Y, Z) and the attitude information (Yaw, Pitch, Law) on the photographing section 110 obtained by measurement with the photographing position measurement sections 120, 125. The general-purpose laptop computer includes an electromagnetic storage device such as a flexible disk storage device or CD-ROM, which is used as the image data storage section 130. A liquid crystal display panel of the general-purpose laptop computer is used as the monitor image display section 142, the model display section 144 and the measurement condition display section 146. The general-purpose laptop computer stores as software a model forming section 155, a photographing condition measurement section (photographing condition setting section) 220 and a reference point display position computing section 190.

The model forming section 155 uses the image data stored in the image data storage section 130 to form a three-dimensional model of the object 10. The calculation procedures to generate a three-dimensional model are specifically described in JP-A-2004-037270 proposed by the present applicant and so on. The model forming section 155 may be a 3D measurement system PI-3000V2 (trade name) available from TOPCON Corporation. The model forming section 155 can measure in 3D and model all in one, from aerial photographs to digital camera images.

The photographing condition measurement section 220 measures the measurement accuracy, baseline, photographing position, photographing angle, and interval between the photographing sections for three-dimensional measurement on the object 10 from the photographing position information on first and second photographed images, and the measurement condition display section 146 displays the measurement results. The first and second photographed images refer to a first photographed image stored in the image data storage section 130 together with its photographing position and a second photographed image displayed in the monitor image display section 142, and are used to form a three-dimensional model of the object 10 in the model forming section 155.

The reference point display position computing section 190 checks image information from the finder of the photographing section 110 to calculate whether or not the coordinate of a reference point entered beforehand falls within the displayable area in the finder image, and displays in real time the reference point as superimposed over the object 10 on the finder image being displayed in the monitor image display section 142.

An exemplary screen view to be displayed on the liquid crystal display panel is illustrated in FIG. 4 described previously, which is used as the monitor image display section 142, the model display section 144 and the measurement condition display section 146, as has been described previously. The monitor image display section 142 is used also as a finder image display section 290, and displays, on the liquid crystal display panel, the finder image information of the photographing section 110, which has been sent to the computer constituting the computation processing section 200 via an interface of various types. Preferably, the reference point relating to the object 10 contained in the finder image may also be displayed as being superimposed, by the reference point display position computing section 190. This allows determining how many reference points are being contained in the monitor image display section 142 when the photographing section 110 performs photographing. The monitor image display section 142 may be configured to call up and to display first and second photographed images sequentially, which have been photographed by the photographing section 110 and stored in the image data storage section 130. The apparatus in FIG. 4 is designed to display three screens, of which two from the left show images previously photographed and stored in the image data storage section 130, and the rightmost one shows an image currently being captured by the photographing section 110. The photographer can easily find the photographing point while checking in real time the three screens being displayed in the monitor image display section 142. Also, previously photographed images can be checked by having images stored in the image data storage section 130 sequentially displayed in all of the three screens.

The image data storage section 130 stores images photographed previously by the photographing section 110 and the photographing positions at which the images have been photographed. The photographing condition measurement section 220 calculates the overlap ratio of the finder image (second photographed image) displayed in the monitor image display section 142 with respect to the last photographed image (first photographed image) stored in the image data storage section 130. Using the measurement accuracy, baseline, photographing position, photographing angle and interval between the photographing sections for three-dimensional measurement of the object 10 measured, the photographing condition measurement section 220 calculates an approximate accuracy of the object 10, and outputs it to the measurement condition display section 146 for display. The approximate accuracy obtained by the photographing condition measurement section 220 is similar to that obtained by the foregoing photographing condition calculation section 180.

Figure 34:
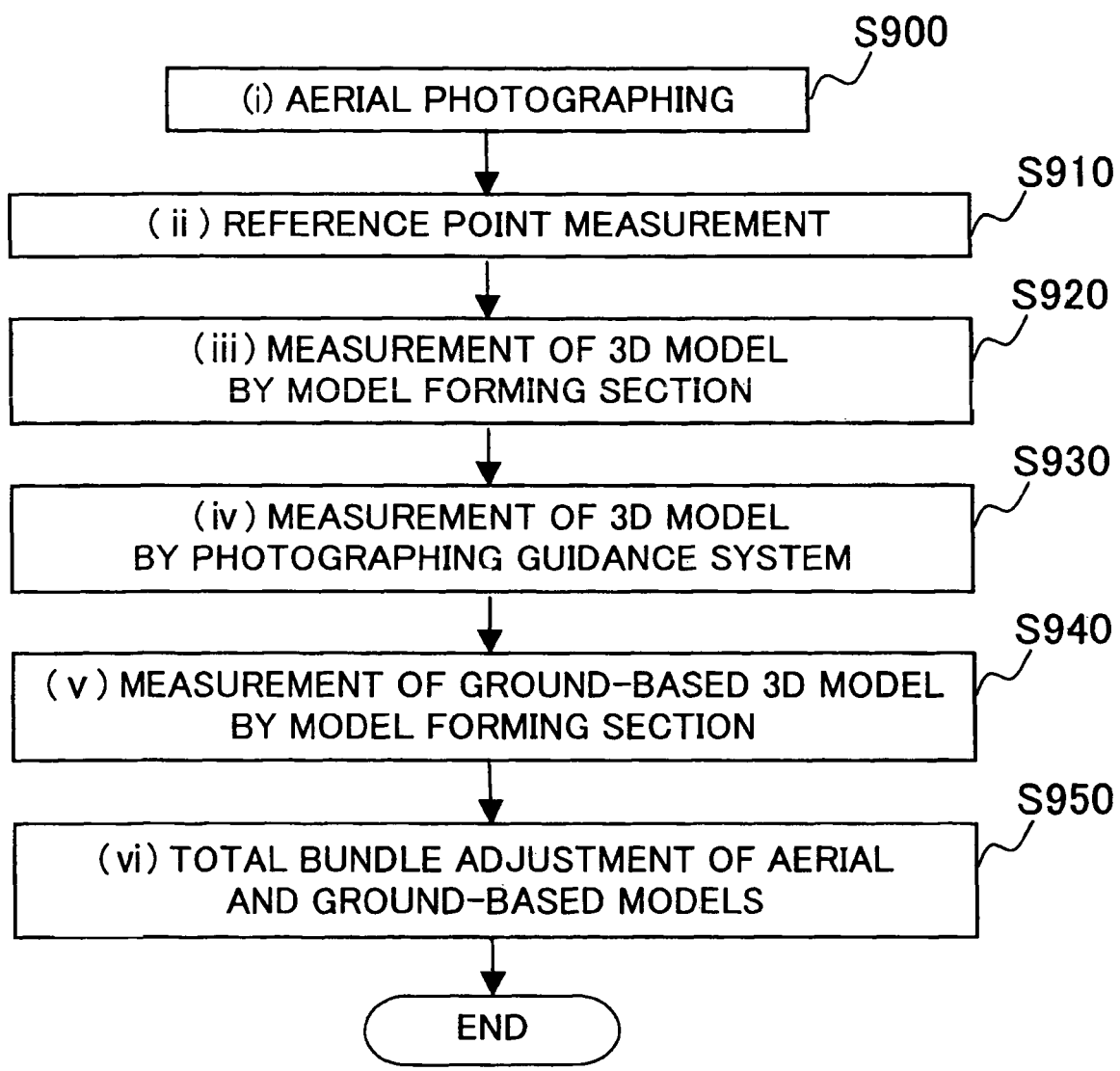
FIG. 34 is a flowchart illustrating the measurement of a 3D model using images photographed from the air and on the ground.

The photographing work with the apparatus configured as described above will be described. FIG. 34 is a flowchart illustrating the measurement to form a 3D model using images photographed from the air and on the ground. Aerial photographing is first performed (S900). The aerial-photographed image may be of various kinds, such as aerial photographs (for example provided by the Geographical Survey Institute), those obtained with a photographing system on a helicopter, airship, balloon, etc., and those image data captured using a paraglider with an engine. Note that the internal orientation elements under the photographing conditions of the photographing section 110 need to be known.

Now, on the ground, reference points necessary to generate a 3D model are obtained with an auto-tracking measuring instrument or a GPS (S910). In this event, measurement values with an auto-tracking measuring instrument should be represented in terms of a global positioning coordinate system via a GPS for uniformity. Using the aerial-photographed image obtained in S900, the model forming section 155 performs a measurement for forming a 3D model of the object 10 (S920). In this event, the reference points obtained in S910 may be used as necessary.

Using a virtual guiding system, the photographing section 110 performs ground-based photographing (S930). Before this step, the reference points measured in S910 and the 3D model data generated in S920 should be stored beforehand in the virtual guiding system. This allows the monitor image display section 142 to display in real time an object image at an angle toward the photographing section 110, with the reference points obtained by the measurement in S910 displayed as superimposed over the object image, while the photographing positions are confirmed. The model display section 144 displays the 3D model generated in S920 at an angle as viewed through the photographing section 110. The measurement condition display section 146 allows confirmation of the measurement accuracy and/or the overlapping state relating to the monitor image display section 142. These functions allow the photographer to bring the photographing section 110 to a most suitable photographing position where a post process such as 3D model generation is in view.

The model forming section 155 performs a stereo measurement on the image photographed using the virtual guiding system, to generate a ground-based 3D model (S940).

The model forming section 155 generates an overall 3D model (S950). The model forming section 155 performs simultaneously bundle adjustments on the pass points and the tie points in each stereo model image photographed from the air or on the ground, to thereby uniform the coordinate systems between the stereo model images photographed from the air or on the ground and hence to generate an overall 3D model. Note that the virtual guiding system can automatically form a ground-based 3D model and generate an overall 3D model for each stereo model image photographed from the air or on the ground, while performing bundle adjustments.

The 3D model generation based on aerial photographs, air images and ground-based images using the foregoing virtual guiding system according to the present invention is similar to the 3D model generation described with reference to FIGS. 12-18.

Fifth Embodiment

Figure 31:
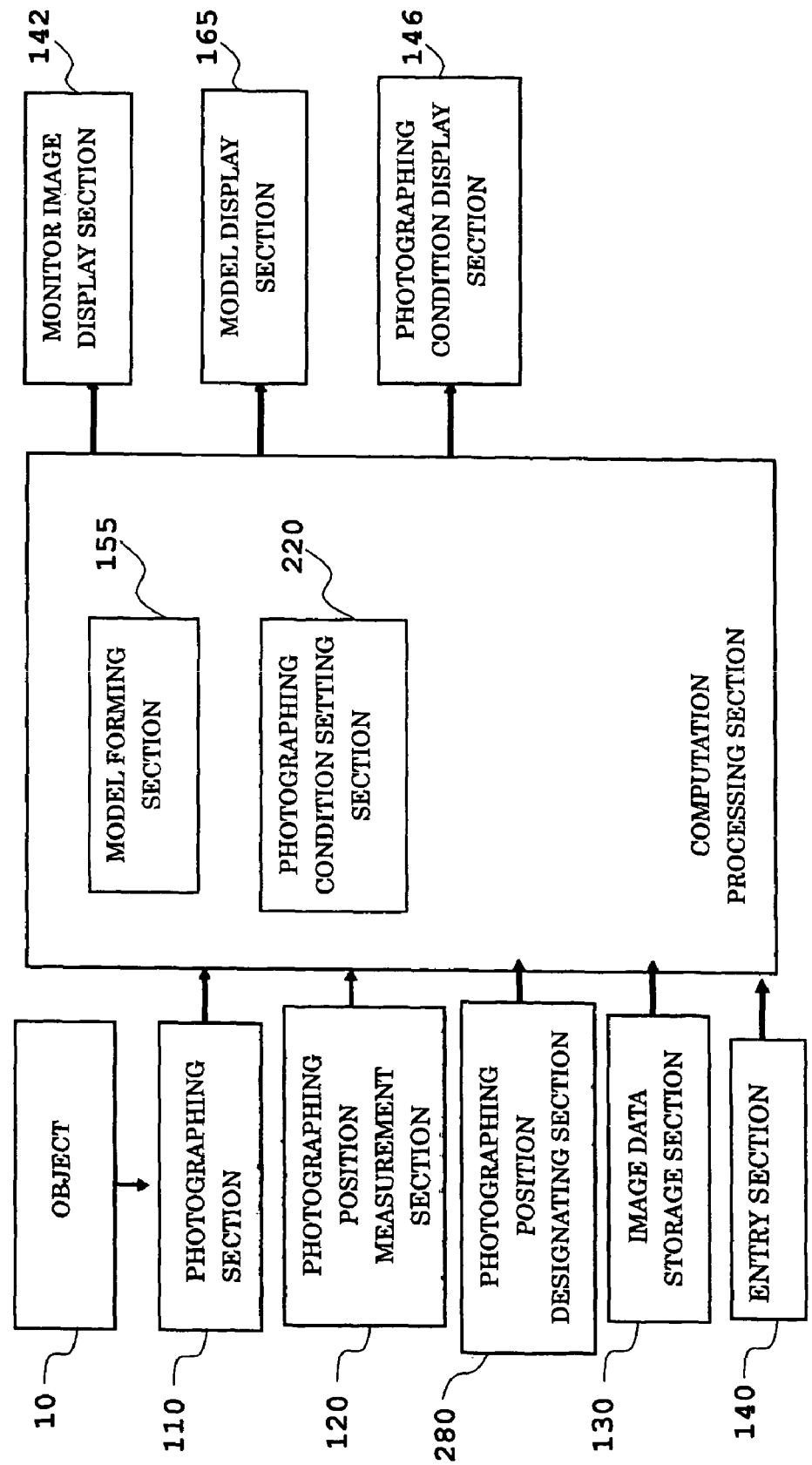
FIG. 31 is a general block diagram illustrating the functionality of a photographing apparatus as a fifth embodiment of the present invention.
Figure 32:
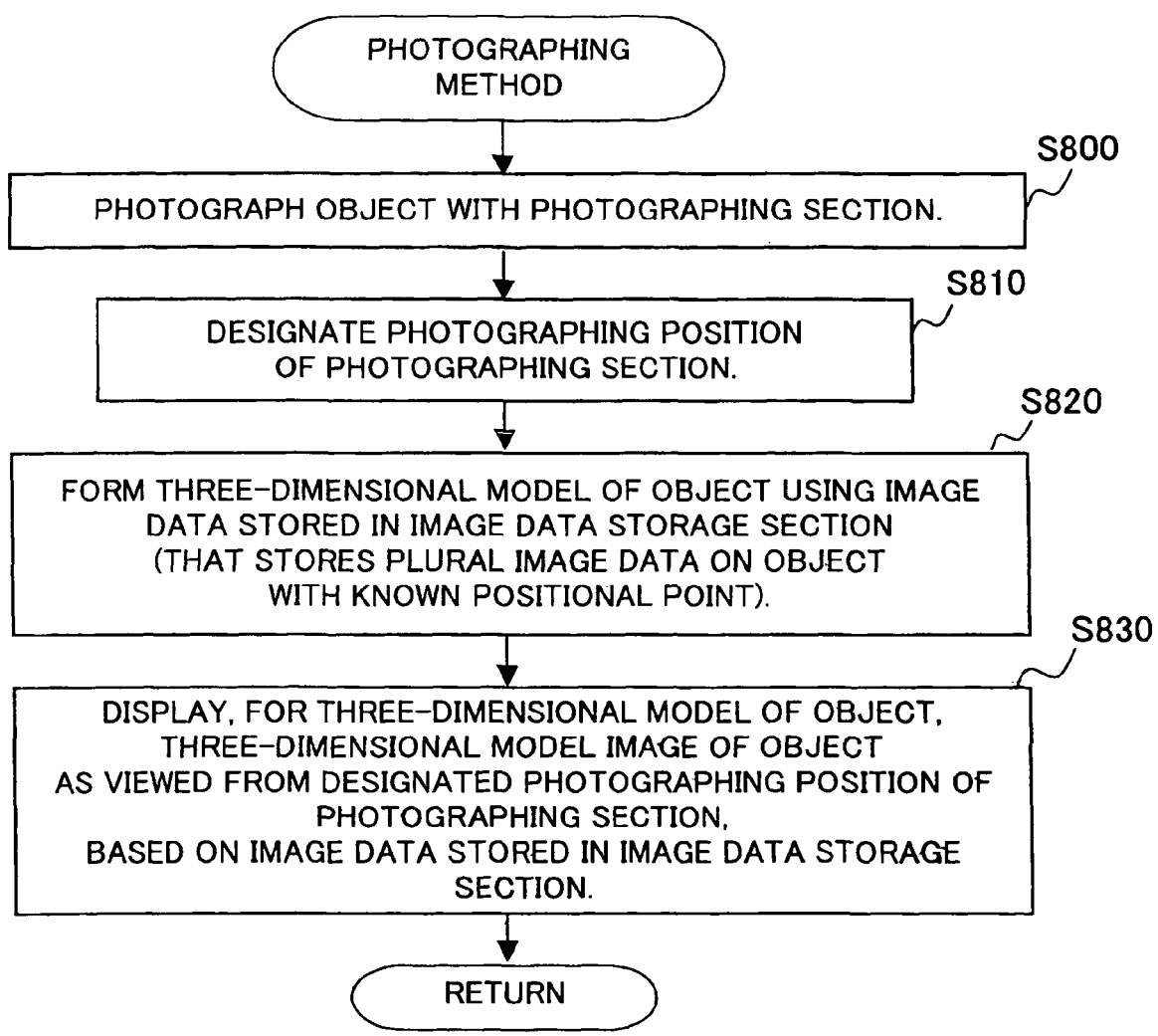
FIG. 32 is a flowchart of a fifth photographing method of the present invention.

In the fourth embodiment, a digital camera and a laptop computer are used in combination as shown in FIG. 3. However, as described in relation to the first and second embodiments, a GPS, a digital camera and a small-sized host PC may be configure integrally. The small-sized host PC may be implemented by, for example, a portable information processing terminal such as a PDA. The functions of the GPS, digital camera and small-sized host PC are the same as those described previously, and their detailed descriptions will not be repeated. The general block diagram of the fifth embodiment of the present invention illustrating the functionality is shown in FIG. 31, and the method of photographing is shown in the flowchart of FIG. 32. The general constitution of the fifth embodiment of the present invention is shown in FIG. 28, which is common to the third embodiment. Here, the description will not be repeated.

Sixth Embodiment

Figure 33:
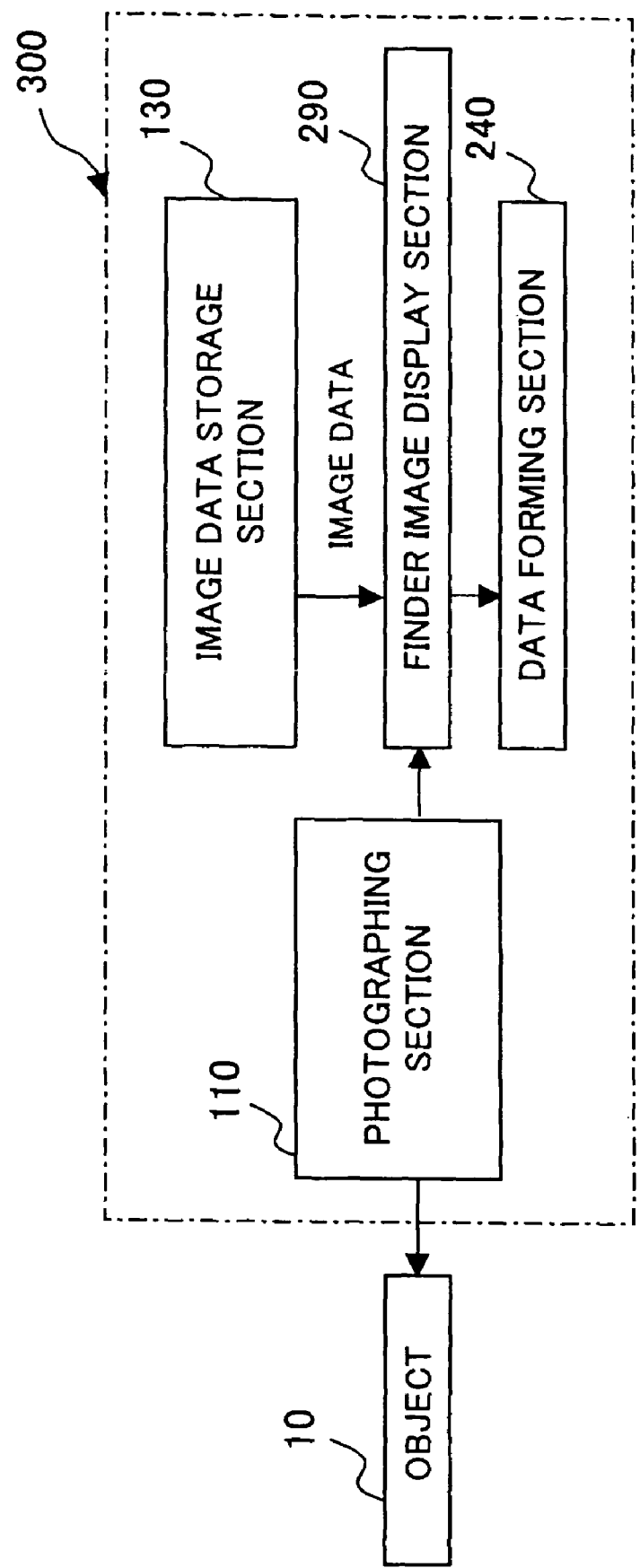
FIG. 33 is a general block diagram illustrating the functionality of a photographing apparatus as a sixth embodiment of the present invention.
Figure 35:
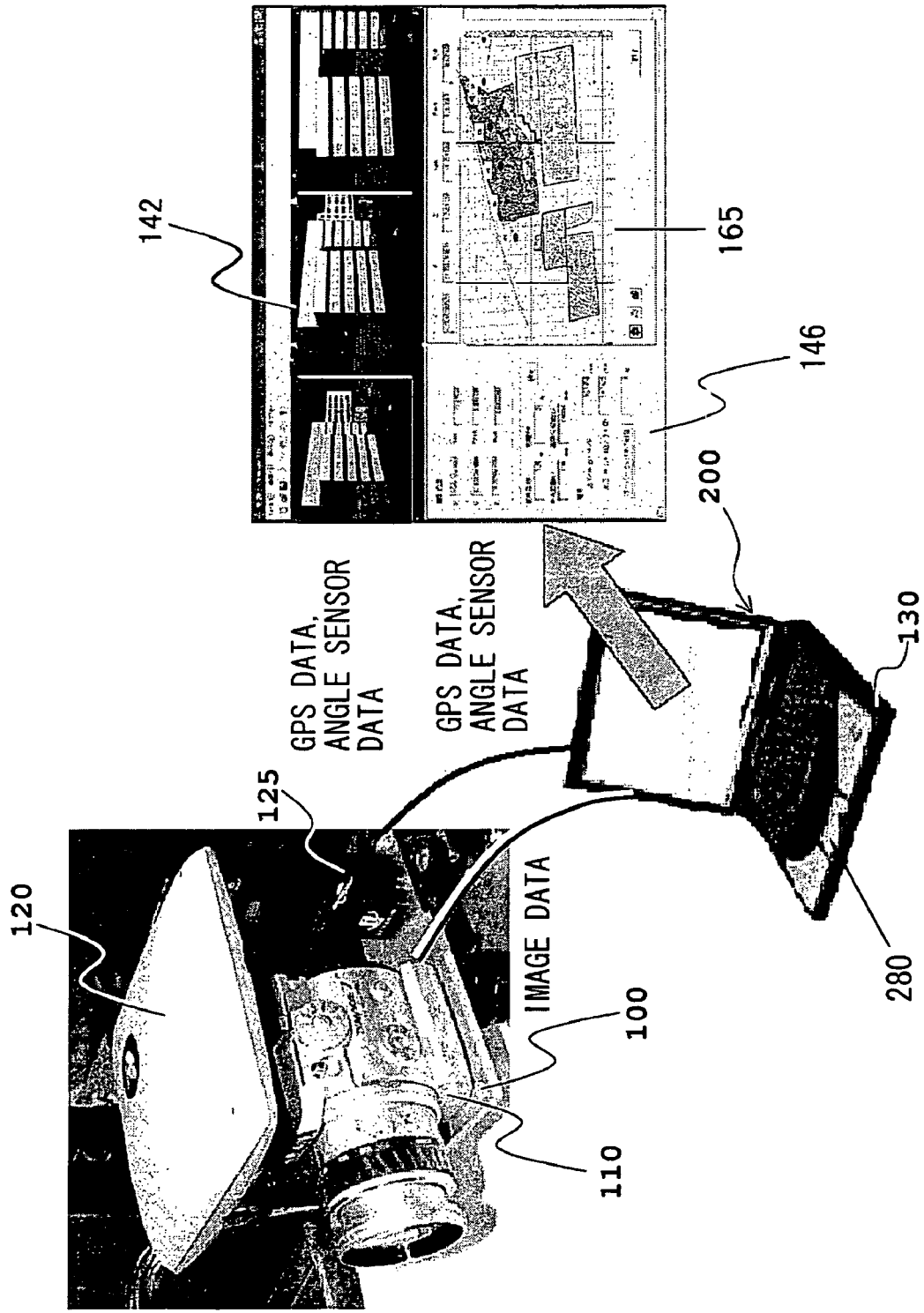
FIG. 35 is a general diagram illustrating the configuration of a sixth embodiment of the present invention.

FIG. 35 is a general diagram illustrating the constitution of a sixth embodiment of the present invention. As shown in the figure, a photographing apparatus of the present invention includes a photographing unit housing 100, a photographing section 110, photographing position measurement sections 120, 125 for obtaining information on the photographing position of the photographing section 110, an image data storage section 130, a monitor image display section 142, a model display section 165, a measurement condition display section 146, a photographing position designating section 280, and a computation processing section 200. In FIG. 35, components having the same functions as those in FIG. 3 are given the same reference numerals. The general block diagram of the sixth embodiment of the present invention illustrating the functionality is shown in FIG. 33. Here, the descriptions will not be repeated.

The photographing position designating section 280 allows designation of the photographing position of the photographing section 110, and may be implemented by, for example, a mouse connected to a personal computer, or cursor keys. The model display section 165 displays, for a three-dimensional model of the object 10 formed by the model forming section 155, a three-dimensional model image of the object 10 as viewed from the designated photographing position of the photographing section 110 based on image data stored in the image data storage section 130 and the photographing position designated by the photographing position designating section 280.

An exemplary photographing position entry screen used to enter the photographing position with the photographing position designating section 280 is shown in FIG. 6 described previously. Preferably, the photographing position entry screen may use, for example, a plan view of the object displayed in the model display section 165. On the photographing position entry screen, the tools such as a light pen or a mouse is used to enter photographing positions 1-6. Then, the model forming section 155 forms 3D models of the object as viewed from the positions entered as photographing positions, and displays visual images in the model display section 165.

Exemplary visual images of the object as viewed from the designated photographing positions and displayed in the model display section 165 are shown in FIG. 10 described previously. When designated photographing positions 1-6 are entered with the photographing position designating section 280, 3D images of the object as viewed from the designated photographing positions 1-6 and at an angle toward the photographing section 110 are formed and displayed on the monitor image display screen 142. The system configuration of the present embodiment may be as shown in FIG. 28.

As has been described above, in the bundle adjustment of an aerial photograph and an image photographed on the ground with the photographing section 110 of the virtual guiding system, it is important to recognize the arrangement of reference points or tie points. According to the present embodiment, the virtual guiding system allows such orientation points to be displayed in real time when the photographing section 110 performs photographing. This allows efficient 3D model construction from the air and on the ground. Also according to the present embodiment, images photographed with a photographing section 110 of various types and at various resolutions can be subjected to a collective bundle adjustment, securing consistency among image measurement data of various kinds. Further, a textured 3D model can be generated using DSM (Digital Stereo Matching) data obtained by measurement through high-accuracy stereo matching, and displayed as viewed from any viewpoint and at various resolutions.

The following are the list of reference numerals for major components used in the descriptions above.
10: measuring object
110: photographing section
120: photographing position measurement section
130: image data storage section
140: display section
142: monitor image display section
144, 165: model display section
146: measurement condition display section
150: recognition section
155: model forming section
160: photographing instruction information section
170: measurement setting section
180: photographing condition calculation section
190: reference point display position computing section
220: photographing condition measurement section
280: photographing position designating section
290: finder image display section

What is claimed is:

1. A photographing apparatus comprising:
a photographing section for photographing an object;
a photographing position measurement section attached to the photographing section for obtaining photographing position information of the photographing section, the photographing position information being information indicating current position where the photographing section is going to photograph the object;
an image data storage section for storing plural image data of the object with a known positional point;
a model forming section for forming a three-dimensional model of the object using the image data stored in the image data storage section;
a recognition section for recognizing an unmodeled part of the object based on the three-dimensional model;
a photographing instruction information section for obtaining photographing instruction information related to photographing the unmodeled part;
a model display section for displaying the three-dimensional model of the object as viewed from the current position, where the photographing section is going to photograph the object in accordance with the photographing instruction information obtained by the photographing instruction information section;
a texture attaching section for dividing the three-dimensional model into plural areas, and attaching a texture of the object to each divided area based on a relationship between the each divided area and a photographing direction in which the photographing section is photographing;
photographing position entry screen for graphically displaying the photographing instruction information obtained by the photographing instruction information section as superimposed over a plan view of an area containing, or over a stereo model of, the object;
an entry section for designating a photographing position, where the photographing section is going to photograph the object, on the photographing position entry screen; and
a display screen for object model for displaying the three-dimensional model of the object as viewed from the photographing position designated.

2. The photographing apparatus according to claim 1, wherein the model forming section forms the three-dimensional model of the object, using a first photographed image stored in the image data storage section together with the photographing position information and a second photographed image displayed in the monitor image display section and the apparatus further comprising:
a photographing condition measurement section for obtaining at least one of measurement accuracy, baseline, photographing position, photographing angle, and interval between photographing sections for three-dimensional measurement on the object from the photographing position information related to the first and second photographed images.

3. The photographing apparatus according to claim 2, further comprising a measurement condition display section for displaying photographing conditions obtained by measurement with the photographing condition measurement section.

4. The photographing apparatus according to claim 1, wherein the image data storage section stores at least a set of stereo images photographed with a photographing device other than the photographing section that is used to form a three-dimensional model of the object in the model forming section.

5. The photographing apparatus according to claim 1, wherein the image data stored in the image data storage section include at least one of a stereo aerial photograph, a stereo small-scale photograph, a stereo low-resolution image and a wide-area photographed image, photographed with a photographing device other than the photographing section.

6. The photographing apparatus according to claim 1, wherein the image data obtained by photographing with the photographing section are stored in the image data storage section such that the known positional point of the object is displayed being superimposed over the image data; and
wherein the image data stored in the image data storage section is therefore used to form a three-dimensional model of the object in the model forming section.

7. The photographing apparatus according to claim 1, wherein the photographing section photographs a first photographed image to be stored in the image data storage section together with the photographing position information and a second photographed image photographed with having an overlapping area with the first photographed image with respect to the object; and
wherein the image data storage section is configured to sequentially store the first photographed image and the second photographed image.

8. The photographing apparatus according to claim 1, wherein the photographing section photographs the object within view sequentially from different photographing positions; and
the monitor image display section displays an object image based on image data of the object obtained by sequentially photographing the object, the image data of the object obtained sequentially photographing the object being other than the image data stored in the image data storage section.

9. The photographing apparatus according to claim 8, further comprising a reference point display position computing section for displaying, in the monitor image display section, at least one of a reference point or a pass point superimposed over the image data obtained by sequentially photographing the object.

10. The photographing apparatus according to claim 1, wherein the photographing position measurement section comprises a GPS.

* * * * *